United States Patent [19]

Schlie et al.

[11] Patent Number: 5,369,660
[45] Date of Patent: Nov. 29, 1994

[54] REPETITIVELY PULSED, CLOSED CYCLE, PHOTOLYTIC ATOMIC IODINE LASER

[75] Inventors: LaVerne A. Schlie; Robert D. Rathge, both of Albuquerque, N. Mex.

[73] Assignee: The United States of America as represented by the Secretary of the Air Force, Washington, D.C.

[21] Appl. No.: 949,615

[22] Filed: Sep. 23, 1992

[51] Int. Cl.⁵ .................................................. H01S 3/22
[52] U.S. Cl. .......................................... 372/55; 372/58; 372/59; 372/61; 372/89
[58] Field of Search .................. 372/55, 58, 59, 61, 372/34, 89

[56] References Cited

U.S. PATENT DOCUMENTS

| | | | |
|---|---|---|---|
| 4,075,579 | 2/1978 | Hunter, Jr. et al. | 372/86 |
| 4,126,833 | 11/1978 | Hundstad et al. | 331/94.5 |
| 4,267,526 | 5/1981 | McDermott et al. | 372/89 |
| 4,318,060 | 3/1982 | Davis | 372/70 |
| 4,418,413 | 11/1983 | Hon | 372/89 |
| 4,450,568 | 5/1984 | Asmus | 372/71 |
| 4,535,457 | 8/1985 | Schlie et al. | 372/58 |
| 4,876,693 | 10/1989 | Lucero et al. | 372/82 |

FOREIGN PATENT DOCUMENTS

| | | | |
|---|---|---|---|
| 0005585 | 1/1990 | Japan | 372/34 |
| 0044082 | 2/1991 | Japan | 372/34 |
| 0044986 | 2/1991 | Japan | 372/34 |
| 0112181 | 5/1991 | Japan | 372/34 |

Primary Examiner—Georgia Y. Epps
Attorney, Agent, or Firm—Stanton E. Collier; Donald J. Singer

[57] ABSTRACT

A repetitively pulsed, high energy, closed cycle photolytic atomic iodine lasers operates at 1.315 microns. Using an iodine ($I_2$) removal system for the photolyzed $C_3F_7I$ laser fuel, more than 70 joules/pulse is output in the fundamental mode from a M=3 confocal unstable resonator at a 0.5 Hz repetition rate. The closed cycle iodine ($I_2$) removal system consisted of a condensative-evaporative section, two Cu mesh $I_2$ sections, and an internal turbo-molecular blower. This closed cycle system uses $C_3F_7I$ gas at 10-60 torr absent of $I_2$. The turbo-molecular blower is able to push high molecular weight gases at high velocities. The turbo-molecular blower is able to produce longitudinal flow velocities greater than 10 m/s through the 150 cm long by $7.5 \times 7.5$ cm² cross sectional photolytic iodine gain region. In addition to the high energy output, the resulting 7–12 $\mu$sec laser beam has a beam quality less than 1.5 times diffraction limited with a coherence length greater than 45 meters, and a polarization extinction ratio better than 100:1. The laser beam was observed to jitter less than 1 microradian. In order to produce high energies, higher repetition rates, and variable pulse widths, a transverse flow gain cell is employed along with electro-optical switches for the flashlamps.

39 Claims, 28 Drawing Sheets

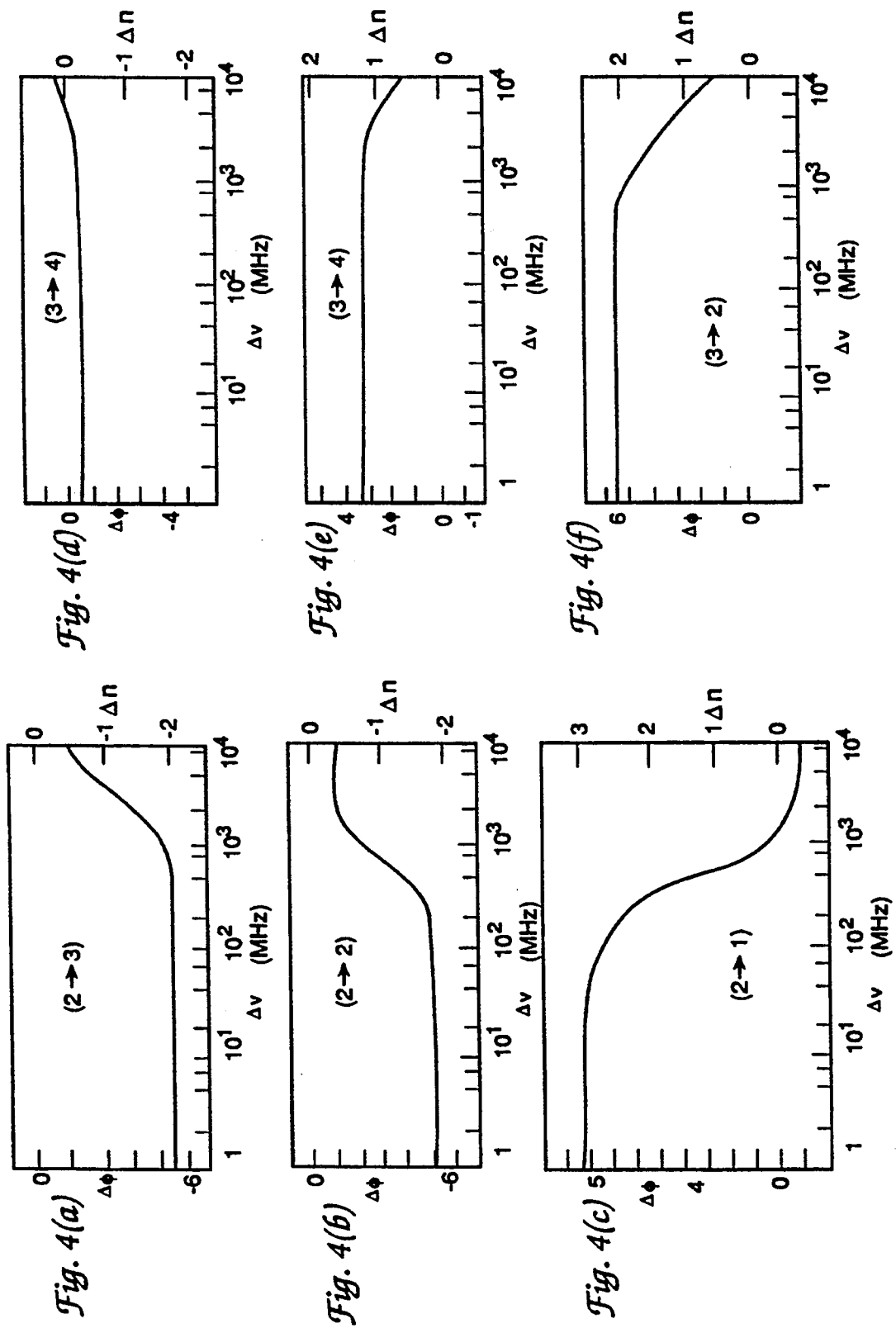

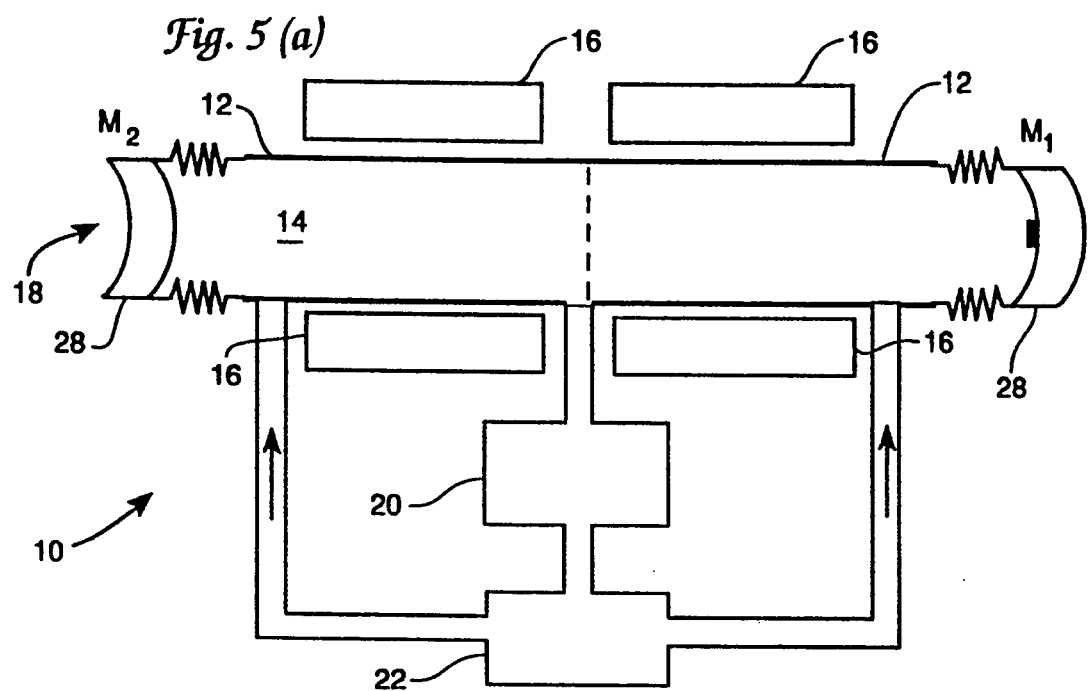
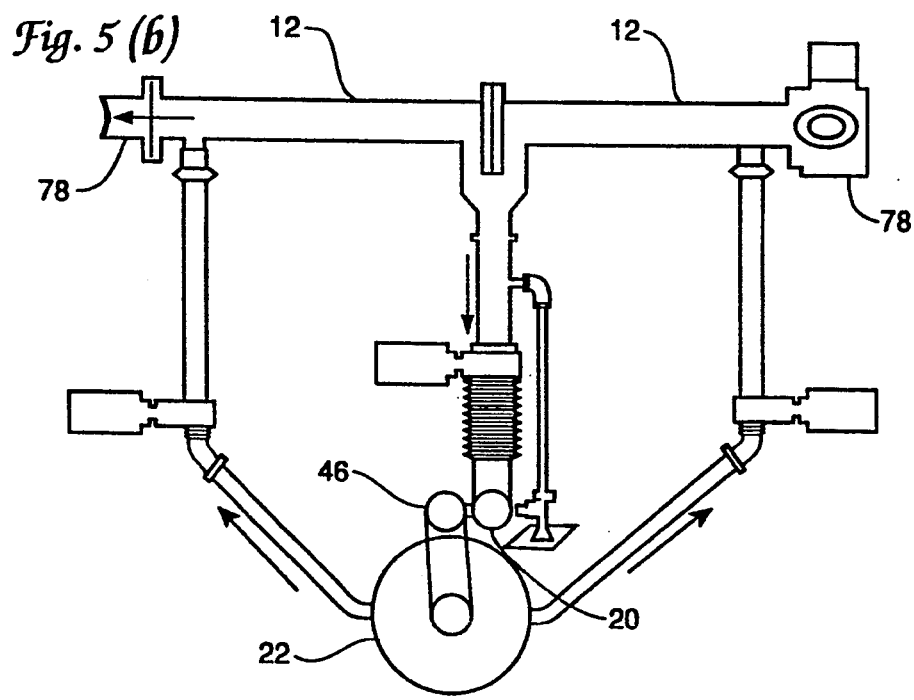

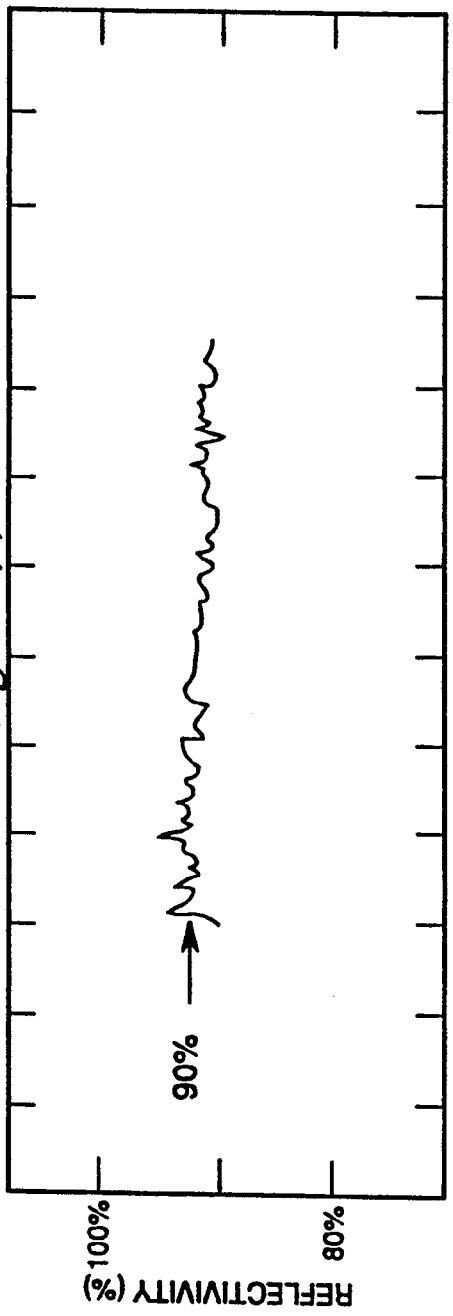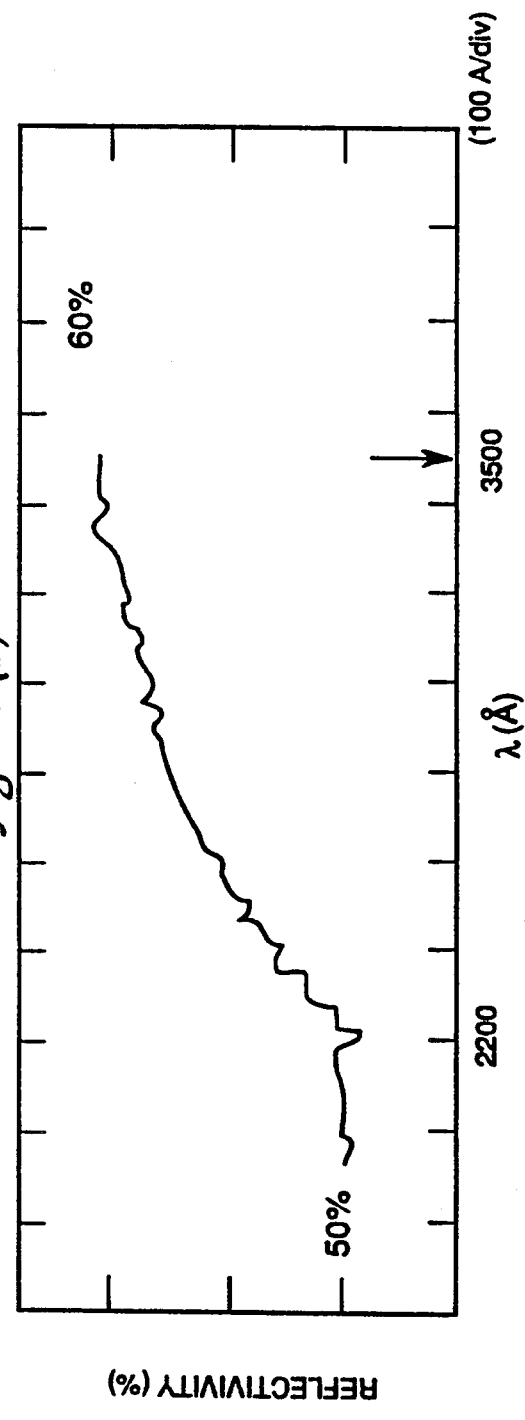
Fig. 10(a)
Fig. 10(b)

T = 10%

E = 22.28
I_p = 12.1KA
5µs/cm

T = 20%

E = 40.25J
I_p = 12.1KA
5µs/cm

T = 30%

E = 40J
I_p = 12.1KA
5µs/cm

T = 39%

E = 51.8J
I_p = 121k Amp
5µs/cm

T = 59%

E = 52.9J
I_p = 12.1KA
5µs/cm

T = 80%

E = 58.6J
I_p = 12.1KA
5µs/cm

BQ < 1.3 → 1.1

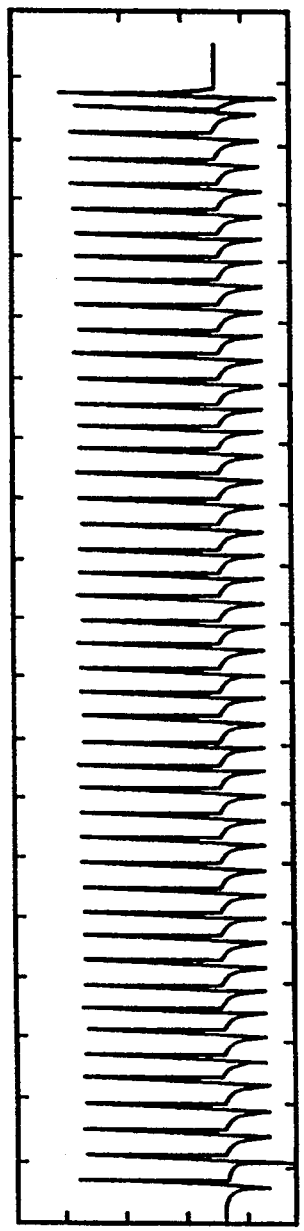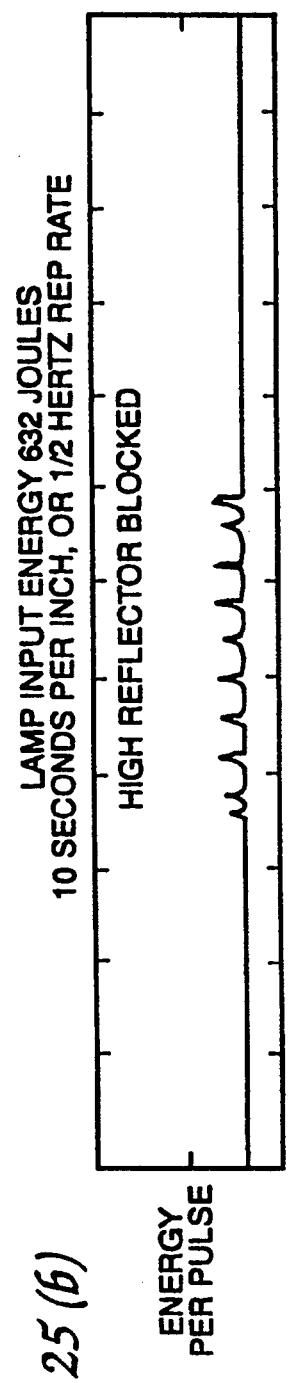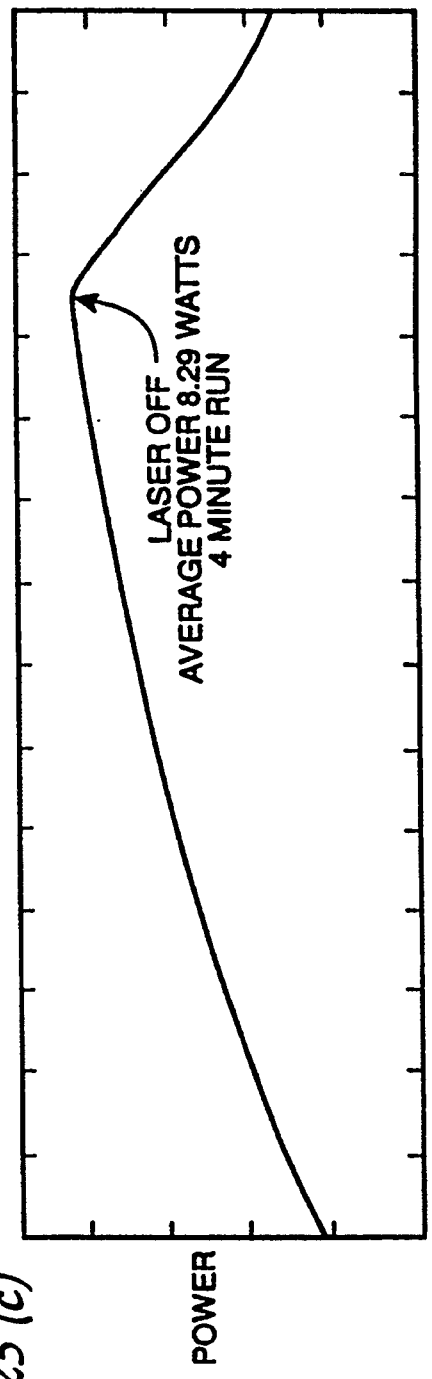

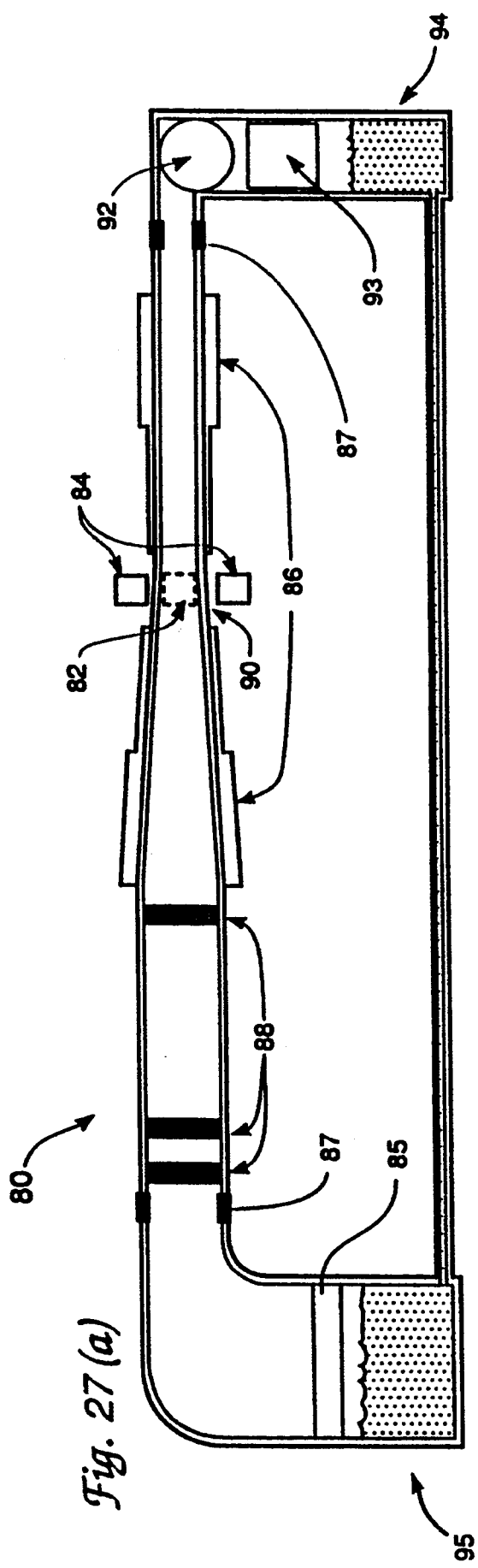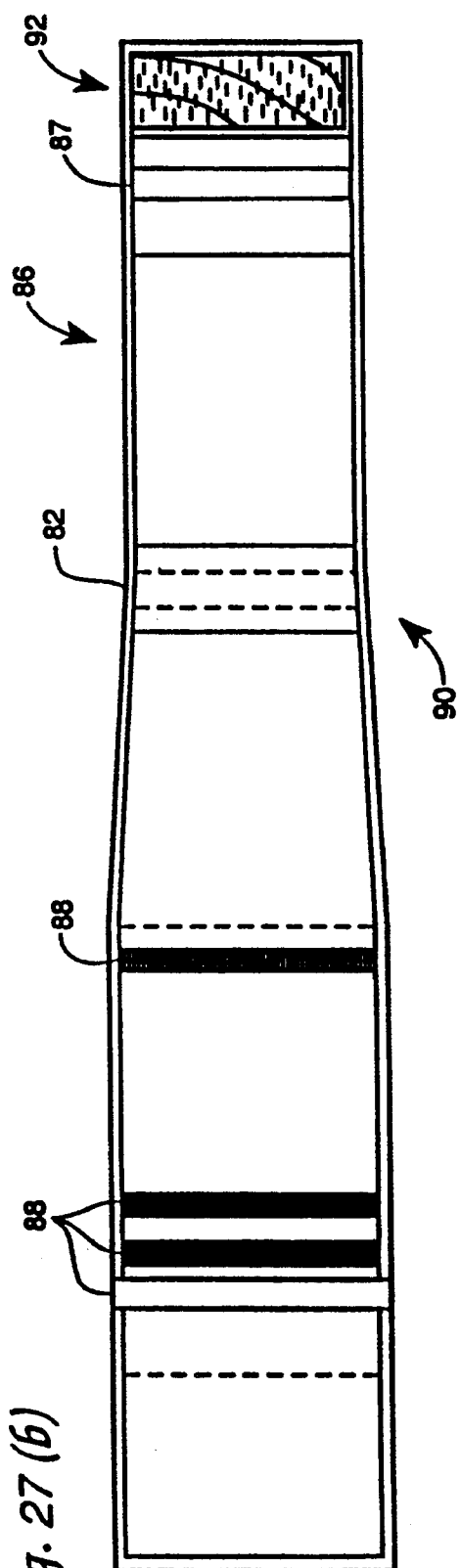
Fig. 27(a)
Fig. 27(b)

REPETITIVELY PULSED, CLOSED CYCLE, PHOTOLYTIC ATOMIC IODINE LASER

STATEMENT OF GOVERNMENT INTEREST

The invention described herein may be manufactured and used by or for the Government for governmental purposes without the payment of any royalty thereon.

BACKGROUND OF THE INVENTION

The present invention is directed at gaseous laser, and, particularly, at photolytic atomic iodine laser, and in greater particularity, at a closed cycle, repetitively pulsed, high energy iodine laser. One prior laser system used an open cycle, gaseous fuel system in a cw iodine laser. Because of loss of fuel and buildup of photolytic by-products, a closed cycle system was used. Both longitudinal and transverse lasers were developed. The fuel flow to these lasers resulted from boiling liquid $C_3F_7I$. Although these systems provided a baseline performance, higher energy and pulsing are desired.

Several systems attempting improvements are Germany's Asterix pulsed photolytic iodine laser which produced energies of 1.0 kilojoules per single shot and another using compressed inert gas flashlamps.

SUMMARY OF THE INVENTION

The present invention provides a repetitively pulsed, high energy/power, closed cycle, photolytic atomic iodine laser operating at 1.315 microns.

The laser system comprises longitudinal laser gain cells having UV flashlamps thereabout being driven by a flashlamp pulser. The flashlamps can be cooled but with a simultaneous degradation of extractable laser energy. Although water cooling was used, nitrogen gas cooling can also be employed but this method is a less effective method. The extractable laser energy is not affected with or without such gas cooling of the flashlamps. The UV energy emitted therefrom enters the gain cells through UV transmitting windows. The lasing energy from the gain cells is input into a resonator before output. A turbo-molecular blower in the fuel system drives the fuel at a given flow rate through the gain cells. After leaving the gain cells, the photolytic by-products, such as $I_2$, are removed by a scrubber.

Therefore, one object of the present invention is to provide a repetitively pulsed, photolytic atomic iodine laser capable of operating with excellent optical properties; namely, high energies with more than 70 joules per pulse in an unstable resonator, excellent beam quality less than 1.2 times diffraction limited, long coherence greater than 45 meters, variable pulsewidth from 5–100's of microseconds, low beam jitter of not more than one microradian and good linear polarization extinction greater than 100:1.

Another object of the present invention is to provide a repetitively pulsed, photolytic atomic iodine laser capable of operating for virtually indefinite time; namely, by using laser fuel (e.g., $C_3F_7I$) which has removed from it, $I_2$ and other undesireable by-products or material (like $H_2O$) and which incorporates an internal turbo-molecular blower providing $C_3F_7I$ flow velocity greater than 10 meters/second at pressures from 5–100 torr.

Another object of the present invention is to provide a means to volumetrically scale energy to much higher values by using longer pulse width flashlamps pulses.

Another object of the present invention is to provide a means of increasing repetition rate by installing transverse flow with a minimization of shock waves via using acoustical absorbing walls downstream and upstream to the laser gain medium.

Another object of the present invention is to provide a repetitively pulsed, high energy photolytic atomic iodine laser which is reliable during long term operation.

These and many other objectives and advantages of the present invention will be readily apparent to one skilled in the pertinent art from the following detailed description of a preferred embodiment of the invention and the related drawings.

BRIEF DESCRIPTION OF THE DRAWINGS

FIGS. 4(a) to (f) illustrate the anomalous dispersion effect on the various hyperfine transitions in atomic iodine versus the pressure broadening for different hyperfine transitions as denoted in the parenthesis (F'→F'').

FIGS. 5(a) and (b) to illustrate a longitudinal flowing "repped" pulsed, photolytic atomic laser at 1.315 microns.

FIGS. 10(a) to (b) illustrate the reflectance properties of two different types of aluminum surfaces.

FIGS. 25(a) to (c) illustrate results of laser pulse energy and average power measurement for the pulsed photolytic atomic iodine laser. Results for a single gain cell of 75 cm. gain length with 8 lamps charged to 25 Hz where the repetition rate is 0.5 Hz.

FIG. 27(a) to (b) illustrates another embodiment of the present invention of a transverse flow, pulsed photolytic atomic iodine laser at 1.315 microns.

DESCRIPTION OF THE PREFERRED EMBODIMENT

Figure 1A:
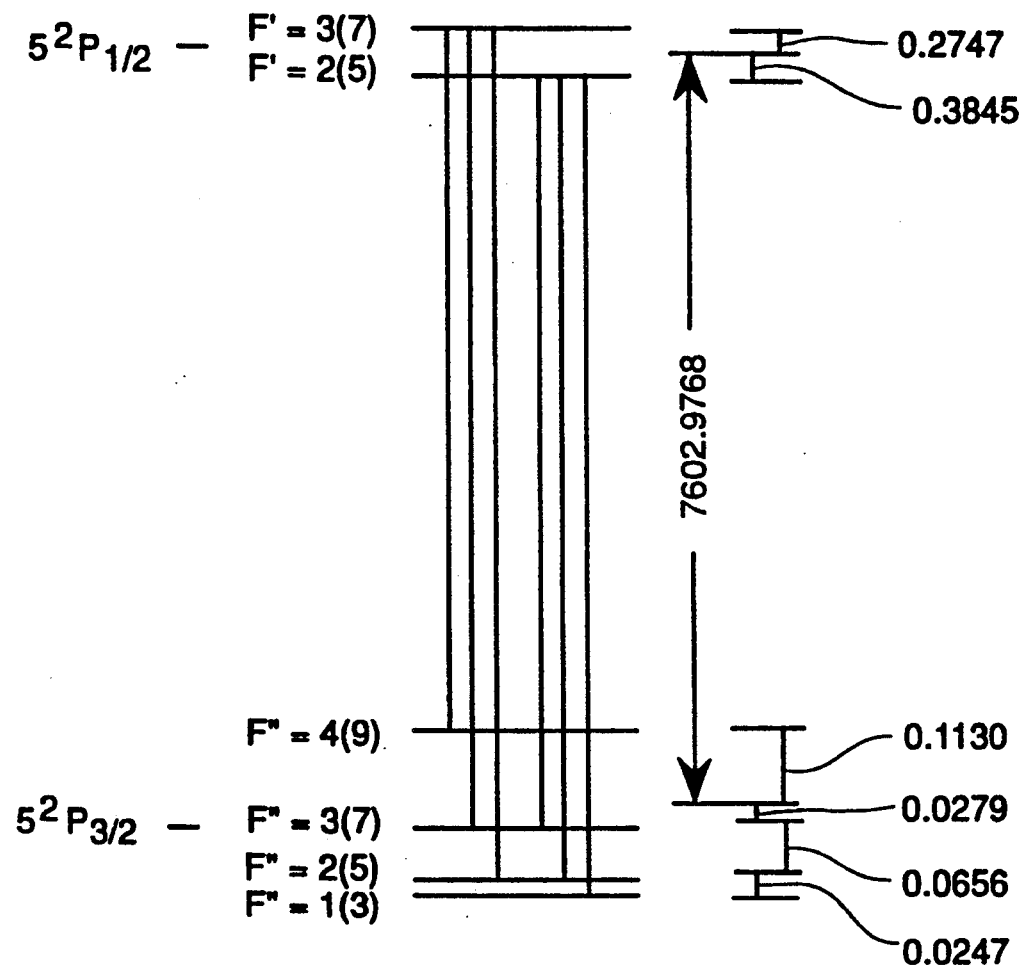
FIG. 1(a) illustrates the hyperfine structure of atomic iodine as function of wave number along with its associated transitions for $5^2P_{\frac{1}{2}}$ and $5^2P_{3/2}$ states. In parenthesis is g, the degeneracy (=2F+1) of the iodine hyperfine level while in (b), is shown the intensity level of the iodine transitions. The number in parenthesis is the relative intensities, and F denotes the quantum number. All energy spacings are given in inverse centimeters.
Figure 1B:
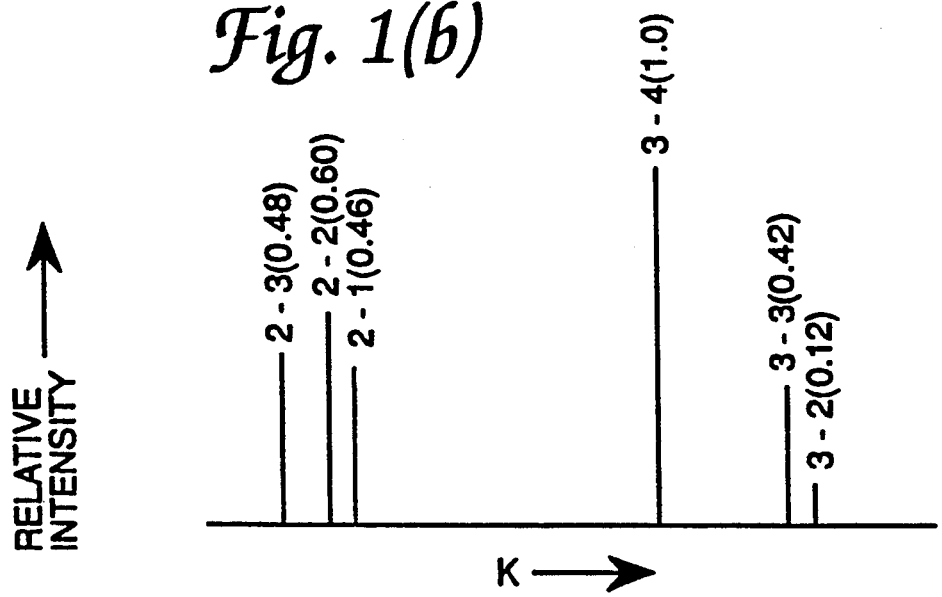

In iodine there exists a significant amount of hyperfine splitting of both the ground and the excited states. The selection rules for different transitions between hyperfine levels are $\Delta F=0$, $\pm 1$ with F' (upper level)=0→F" (lower level)=0, not allowed. There exists 2J+1 values for F; i.e., two for the upper-state and four for the lower-state levels of atomic iodine. In FIG. 1(a), these energy levels are depicted for the both the ground $5^2P_{3/2}^{(I)}$ and the first excited $5^2P_{\frac{1}{2}}^{(I^*)}$ states long with their degeneracies (g=2F+1). As shown in FIG. 1(b) the transitions are governed by the above selection rules plus the relative intensities of each transitions. The dominant transition is F'=3 to F"=4. Table I lists the wavelengths in both micrometers and wave numbers ($k=1/\lambda$) in centimeters of each transition cited plus their A-coefficients.

TABLE I

Atomic Iodine Hyperfine Transition Characteristics

| Transition F'→F" | Wavelength k (cm$^{-1}$) | λ (μm) | A-coefficients (sec$^{-1}$) |
|---|---|---|---|
| 2-3 | 7602.6202 | 1.315336 | 1.76 |
| 2-2 | 7602.6858 | 1.315325 | 2.20 |
| 2-1 | 7602.7105 | 1.315320 | 1.69 |
| 3-4 | 7603.1385 | 1.315246 | 3.67 |
| 3-3 | 7603.2794 | 1.315222 | 1.54 |
| 3-2 | 7603.3450 | 1.315211 | 0.44 |

The existence of these six iodine hyperfine transitions have a significant effect on the coherence length of atomic iodine lasers. Since the coherence length varies inversely with the linewidth, the number of oscillating hyperfine transitions is important. The coherence length ($L_c$) equates to $c/\Delta\nu$ or $1/\Delta k$ where c is the velocity of light, $\Delta\nu$ is the linewidth of the laser, and $\Delta k$ is the corresponding wave number difference. If all six of the iodine hyperfine transitions existed in the laser output, then $\Delta k = 0.725$ cm$^{-1}$ giving a small coherence length of 1.37 cm. For simplicity, only the line center $\Delta k$ values are used here. With only the two highest gain hyperfine transitions, F'=3→F"=4 and 2→2, oscillating, $\Delta k = 0.453$ cm$^{-1}$ yielding a laser coherence length of 2.21 cm. This simple analysis relates that long coherence lengths will exist only if a single hyperfine transition oscillates.

When only one hyperfine transition is lasing, there is still a significant decrease in the iodine laser's coherence length if two or more longitudinal modes are oscillating. With the unstable mirror spacing at 2.84 meters, a c/2L value of 52.8 MHz results corresponding to a coherence length 5.68 meters. Since the Doppler broadened linewidth 240 MHz (FWHM) at room temperature is much larger than this c/2L value, more than one longitudinal mode is possible. For a $C_3F_7I$ laser the optimum operating pressure of $C_3F_7I$ is 30–45 torr, FIG. 18. For this pressure range, the large 20 MHz/torr broadening coefficient of $C_3F_7I$ causes the iodine hyperfine transitions to become homogeneously broadened to linewidths of 600 to 900 MHz. Calculated gain profiles in FIGS. 2(a-c) verify this condition. Since a homogeneously broadened gain profile has only one oscillating longitudinal mode, coherence lengths for this pulsed iodine laser are expected to be large as similarly observed in cw photolytic iodine laser.

Figure 3:
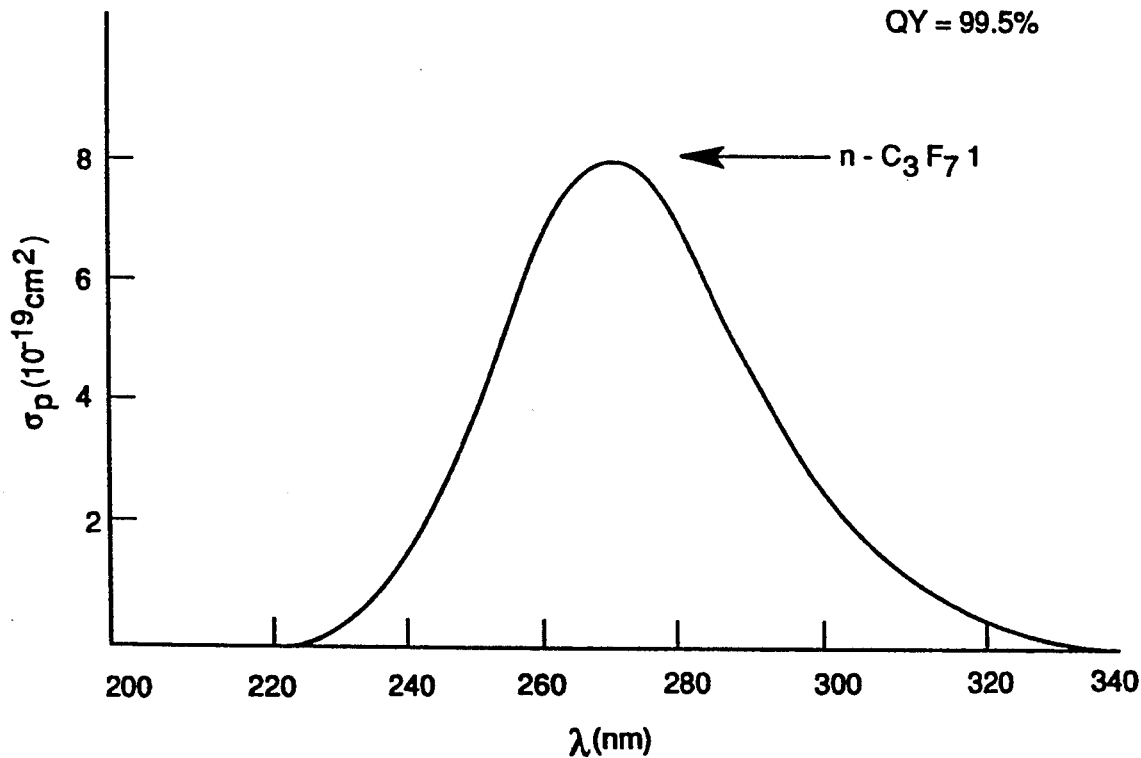
FIG. 3 illustrates the $C_3F_7I$ photolytic excitation cross section.

With 240–320 nm UV (ultraviolet excitation radiation, n-$C_3F_7I$ (normal form) is photolytically excited into an excited iodine $5^2P_{\frac{1}{2}}$ atom and a free n-$C_3F_7$ radical specie with nearly 100% quantum yield. This photoexcitation cross section is given in FIG. 3. Other alkyl-iodides (e.g., i-$C_3F_7I$ and $C_3F_7I$) have similar high quantum yield values, but n-$C_3F_7I$ is used since it is easier to procure in the United. The iso-form of $C_3F_7I$ is believed to have an "effective" higher re-association rate because the formation of $(C_3F_7)_2$ is much slower. Hereafter, all citing of n-$C_3F_7I$ is denoted simply by $C_3F_7I$. The photolysis cross section peaks near 272 nm with a magnitude of $\sigma_p$ 7.8×10$^{-19}$ cm$^2$. This cross section $\sigma_p$ can be used to establish the $C_3F_7I$ operating pressure for a $\sigma_p$ specific cross sectional area of an iodine laser medium. Since the photolytic cross section extends over the 240–320 nm region, a mean approximate value of 4×10$^{-19}$ cm$^2$ provides a better estimate for the mean free path length calculations. Table II lists these mean free path lengths $l_p$ ($=1/N\sigma_p$) for various $C_3F_7I$ pressures where N represents the $C_3F_7I$ density. For a situation requiring uniform excitation by UV pumping from a single side, the mean free path of the UV radiation must be significantly larger than the gain medium's transverse dimension d.

TABLE II

Mean Free Path Lengths versus Pressure of $n$-$C_3F_7I$

| $n$-$C_3F_7I$ Pressure (torr)[a] | Mean Free Path Length - $l_p$ (cm) |
|---|---|
| 5 | 15.3 |
| 10 | 7.67 |
| 15 | 5.11 |
| 20 | 3.83 |
| 25 | 3.07 |
| 30 | 2.56 |
| 35 | 2.19 |
| 40 | 1.92 |
| 45 | 1.70 |
| 50 | 1.53 |
| 55 | 1.39 |
| 60 | 1.28 |
| 70 | 1.10 |
| 80 | 0.96 |
| 90 | 0.85 |
| 100 | 0.77 |

[a]All calculations made assuming gas temperature of 23° C.

Square or rectangular physical geometries having excitation from 2 or more sides require uniform pumping when $d \cong 4l_p$. Establishment of uniform gain throughout the photolytically excited volume greatly simplifies constraints for the unstable resonators used in optimizing the extractable laser energy. A nearly uniform near-field laser beam profile in the lowest mode operation is observed at $C_3F_7I$ pressures of 30–45 torr in the $7.5 \times 7.5$ cm$^2$ cross section excited on opposite sides. The corresponding $l_p$ is 2.56–1.70 cm which is approximately $d/4$. With very intense pulsed UV flashlamp sources, however, the iodine gain region can experience "bleaching" effects as reported by others. The term bleaching describes the phenomena in which all the species of a gaseous medium capable of interacting with external radiation (here UV) are destroyed. Bleaching effects in $C_3F_7I$ gaseous mediums causes all molecules to be dissociated into $C_3F_7$ and excited I-$5^2P_{\frac{1}{2}}$. Associated with this bleaching effect are intense medium shock waves due to the pressure doubling and a sudden temperature rise. The large fractional dissociations of the $C_3F_7I$ associated with this bleaching phenomena, however, requires a significant replenishment of the laser fuel. This result makes closed cycle operation more difficult due to the large quantity of $I_2$ which must be removed by the iodine ($I_2$) removal system. In results discussed below for $d \cong 4l_p$, the flashlamp's UV intensity was not sufficient to create bleaching effects since less than 1% of the $C_3F_7I$ was photolyzed into excited I* and $C_3F_7$. Nearly uniform gain across the cross sectional area was verified by the unstable resonator performance.

A simple analysis of the flashlamp output and the subsequent UV radiation interaction with the $C_3F_7I$ in the gain medium provides valuable insight into the operation of this repetitively pulsed photolytic atomic iodine laser. First, the peak input power deposited into the flashlamps was approximately 300 MW, (FIG. 20(b)). Other laser pulses to output coupling are shown in FIGS. 20(a)-(f). Accounting for the twelve (12) 1 cm i.d., 80 cm arc length flashlamps excited by a 3.8 $\mu f$ capacitor charged to 30 KV gives the lamp's output intensity of 80 KW/cm$^2$. Using a nominal UV conversion efficiency of 2% yields an intensity of 1.25 KW/cm$^2$ corresponding to a fluence of $2.5 \times 10^{21}$ photons/cm$^2$-sec at the 272 nm $C_3F_7I$ peak cross section. Assuming a 10 $\mu$sec flashlamp square pulse, a peak excited iodine density of $10^{16}$/cm$^3$ can be produced if there exists 30 torr of $C_3F_7I$ in the gain region. This excited iodine density corresponds to an unsaturated small signal gain coefficient of 5%/cm. For an excited iodine density of $10^{16}$/cm$^3$, only 1% of the $C_3F_7I$ laser fuel is being excited which is small in comparison to explosively excited iodine lasers which experience nearly 100% bleaching. These low fractional excitations enable the closed cycle, iodine ($I_2$) removal system to operate successfully.

Once the $C_3F_7I$ molecules are photolyzed, various kinetic process occur in the iodine gain medium as listed in Table III. There are many other kinetic mechanisms existing, but the list provided highlights the most important features. Temperature dependent rates which play a very significant role in the overall kinetics of the pulsed photolytic iodine laser system are not included in this list. For the results reported here, no buffer gas was used. This list of kinetic processes emphasizes the photolytic excitation, quenching, "parent" molecule recombination, formation of $I_2$ by-product, and radiative/stimulated processes. Some processes are included to emphasize the $C_3F_7I$ laser fuel purity requirements.

The extractable energy of pulsed photolytic atomic iodine lasers having high peak ultraviolet radiation generated from flashlamps; however, can vary significantly due to impurities and the photolytic by-product $I_2$. Elimination of $O_2$, $H_2O$, and $I_2$ is essential to minimize these excited iodine quenching processes. The result is higher energies along with earlier onset of lasing relative to the flashlamp's initiation. In the absence of such impurities, only two quenching processes for the excited iodine atoms exists. These are the re-association of the parent molecule (reaction 6 of Table III) and quenching by the parent molecule (reaction 8). Hence, the quenching processes are

TABLE III

Pertinent Kinetic Processes for cw Atomic Photolysis Iodine Laser

| Reaction | Rate Coefficient[a] |
|---|---|
| 1. RI + $h\nu_{pump} \rightarrow$ R + I | $\sigma_p(max) = 7.8 \times 10^{-19}$ cm$^2$ |
| 2. I* $\rightarrow$ I + $h\nu_{rad}$ | A = 7.7 sec$^{-1}$ |
| 3. I* $\rightarrow$ I + $h\nu_{laser}$ | $\sigma_{se} = 5.5 \times 10^{-18}$ cm$^{2(b)}$ |
| 4. I* (diffusion) $\rightarrow$ I | D(STP) = 0.009 cm$^2 \cdot$ sec$^{-1}$ |
| 5. I + R $\rightarrow$ RI | $4.7 \times 10^{-11}$ |
| 6. I* + R $\rightarrow$ RI | $7.9 \times 10^{-13}$ |
| 7. R + R $\rightarrow$ R$_2$ | $1.3 \times 10^{-12}$ |
| 8. I* + RI $\rightarrow$ I + RI | $2.8 \times 10^{-16}$ |
| 9. I* + O$_2$ $\rightarrow$ I + O$_2$*($^1\Delta_g$) | $2.5 \times 10^{-11}$ |
| 10. I* + H$_2$O $\rightarrow$ I + H$_2$O + heat | $9.6 \times 10^{-13}$ |
| 11. I* + N$_2$ $\rightarrow$ I + N$_2$ + heat | $5.2 \times 10^{-17}$ |
| 12. I* + I + RI $\rightarrow$ I$_2$ + RI | $3.8 \times 10^{-31}$ |
| 13. I* + I + I$_2$ $\rightarrow$ 2I$_2$ | $3.7 \times 10^{-30}$ |
| 14. I* + I$_2$ $\rightarrow$ I + I$_2$ | $9.9 \times 10^{-12}$ |

[a]Rate coefficients have dimensions (cm$^3$/molecule)$^n$/sec where n = 1 for two body reactions and n = 2 for three body reactions described in reactions 1–4.
[b]Evaluated assuming only Doppler broadening (T = 300° K.). At higher pressures, the effects of pressure broadening on $\sigma_{se}$ must be included.

$$I^* = R \rightarrow RI \quad (1)$$

$$I^* + RI \rightarrow I + RI \quad (2)$$

having respectively rate constants of $7.9 \times 10^{-13}$ and $2.8 \times 10^{-16}$ cm$^3$.sec$^{-1}$. Hereinbelow relates an optimum $C_3F_7I$ operating pressure of 30–45 torr and 26%/cm gain coefficients. Using the iodine stimulated emission cross section, $\cong 10^{-18}$ cm$^2$ at 500 MHz pressure broadening gives an excited iodine density of $10^{-16}$ cm$^3$. For these conditions in an iodine gain medium, the I* loss rates are respectively 7900 and 274 sec$^{-1}$. During a 10 μsec laser pulse, these processes have negligible effects.

The I* quenching processes due to $O_2$, $H_2O$, and $N_2$ impurities are particularly important since all of the gases can easily be dissolved in liquid $C_3F_7I$. To emphasize their detrimental effects, it is assumed that the quenching rate from these impurities must be less than 1/10 of the lowest non-purity quenching rate process, namely $C_3F_7I$ quenching, reaction (8) in Table III. Referring to the above analysis, the concentrations of $O_2$, $H_2O$, and $N_2$ must, respectively, be less than $1.83\times10^{13}/cm^3$ (0.5 microns), $4.6\times10^{14}/cm^3$ (13.6 microns), and $8.7\times10^{19}/cm^3$ (3.26 Atm). Consequently, removal of all $O_2$ and $H_2O$ impurities from the laser gas $C_3F_7I$ is mandatory. $N_2$, however, produces negligible quenching. Any significant concentrations of $N_2$, however, will decrease the stimulated emission cross section due to pressure broadening.

Another major kinetic quenching process in photolytic atomic iodine lasers is the I* quenching by the photolytic by-product $I_2$ (reaction 14), namely $$I^* + I_2 \rightarrow I + I_2 + \text{heat} \quad (3)$$

which has a large quenching rate constant, approximately $10^{-11}$ cm$^3$-sec$^{-1}$. The effect of this quenching process will increase during the photolytic UV pumping pulse because $I_2$ is a by-product of the irreversible recombination channel of the photolyzed $C_3F_7I$. Since the only mechanism to destroy the $I_2$ as it is formed in the lasing medium is the small dissociation by 500 nm radiation, flow must be used to transfer it from the laser gain region for subsequent removal by condensation. The rate coefficients for the two possible ternary iodine dimerization processes are listed in Table III (processes 12 and 13) and assumed to be equal for each of the species M ($C_3F_7I$ and $I_2$). A quick analysis, however, illustrates that negligible $I_2$ is formed during the 7–12 μsec laser pulse reported below. At the maximum $C_3F_7I$ pressure of 60 torr used below, the concentration of $C_3F_7I$ is $1.96\times10^{18}/cm^3$. No degeneracy effects are included. For reaction (12) of Table III, the 3-body formation rate by $C_3F_7I$ is then $7.5\times10^3$ sec$^{-1}$ or 1/134 μsec. Therefore, during lasing no significant excited iodine quenching by $I_2$ should be expected. Its removal by the iodine ($I_2$) removal system, however, is crucial.

Important to all atomic iodine lasers is the effect of gain medium density fluctuations on the quality of the output laser beam. The ability to obtain a near diffraction-limited optical beam critically depends on the magnitudes of two parameters; namely, the spatial variation of these gas density fluctuations characterized by the gain medium's $\Delta N/N$ or $\Delta\rho/\rho$ variation and the refractivity, $\Delta n$, or polarizability $\alpha$/Gladstone-Dale constant $\beta$, of the individual gaseous species present. $\beta$ and $\alpha$ are related as $\beta = 2\pi\alpha\, N_s$ where $N_s$ is the particle density at STP conditions, $2.68\times10^{19}/cm^3$ and $\Delta n = 2\pi\alpha\, N$ with N equal to the total number density of the gas being examined. Table IV lists these parameter for species present in the pulsed photolytic iodine gain mediums. The magnitude of each of these quantities

TABLE IV

| Polarizabilities ($\alpha$) and Gladstone-Dale Constants ($\beta$) for Various Gases | | | |
|---|---|---|---|
| λ (Å) Gas | 4880 | 5145 | 13150 |
| $H_2O$ | 1.50 (2.526) | 1.55 (2.610) | 1.49 (2.509) |

TABLE IV-continued

| Polarizabilities ($\alpha$) and Gladstone-Dale Constants ($\beta$) for Various Gases | | | |
|---|---|---|---|
| λ (Å) Gas | 4880 | 5145 | 13150 |
| $N_2$ | 1.78 (2.997) | 1.77 (2.980) | 1.77 (2.980) |
| $O_2$ | 1.62 (2.728) | 1.62 (2.728) | 1.57 (2.644) |
| $I_2$ | a | a | 12.5 (21.049) |
| $C_3F_7I$ | 12.0 (20.207) | 12.1 (20.375) | 11.6 (19.533) | a. Absorption of the laser radiation at this particular wavelength by $I_2$ prevented any interferometric measurements.

dictate the non-constant cross-sectional phase shift difference, $\Delta\phi$, an optical beam experiences while propagating through a medium of length L with spatially varying density and is expressed as $$\Delta\phi = \frac{1}{\lambda}\frac{\Delta\rho}{\rho_O}\beta\frac{\rho_O}{\rho_S}L = \frac{1}{\lambda}\frac{\Delta N}{N_0}2\pi\alpha\frac{N_O}{N_S}L = \frac{2\pi}{\lambda}\alpha(N - N_0)L \quad (4)$$

where $\Delta\rho$ is the gas density disturbance relative to equilibrium conditions and equal to $(\rho-\rho_o)$ where $\rho$ is the perturbed gas density and $\rho_o$ the equilibrium, nonperturbed gas density value. $\rho_s$ is the gas density at STP conditions and $\Delta N = N - N_o$, the particle density difference. Assuming a maximum single pass phase shift across the gain media less than 1/10 wave over the 150 cm gain length reported below, Eqn. (4) relates $\Delta\rho/\rho_o$ must be less than $1.75 - 2.6\times10^{-3}$ when the initial operating $C_3F_7I$ pressure of 30–45 torr is taken. Such a requirement can easily be established and is intimately associated with the excellent unstable beam quality reported below.

Figure 2A:
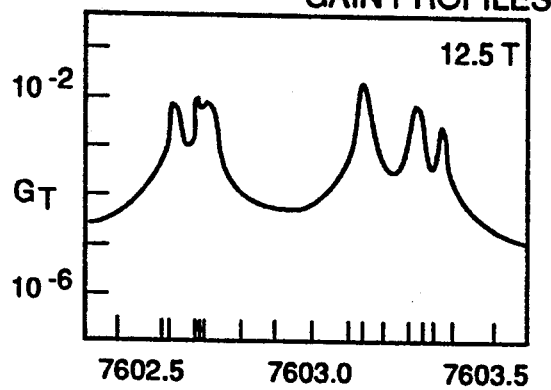
FIGS. 2(a) to (f) illustrate the sum of fractional gain and phase shift (degrees) profiles for three different pressures of $C_3F_7I$.
Figure 2D:
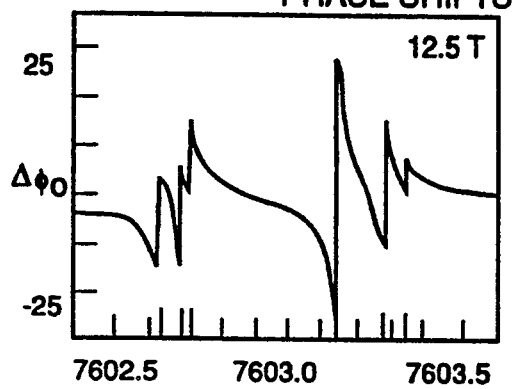
Figure 2B:
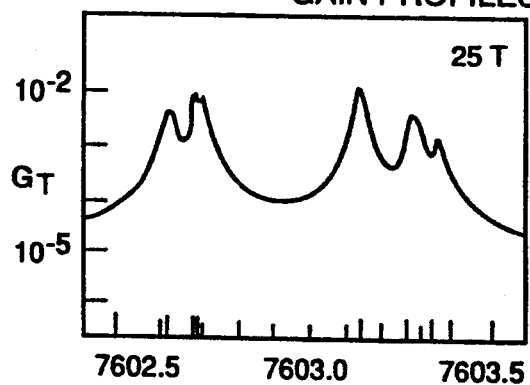
Figure 2E:
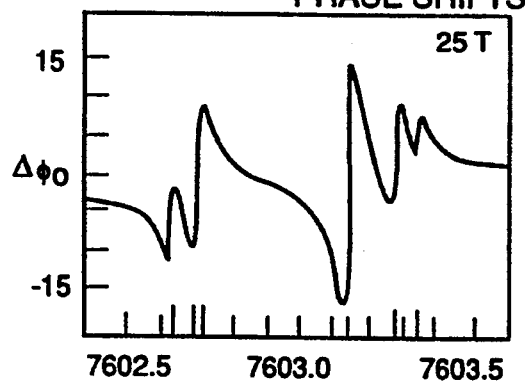
Figure 2C:
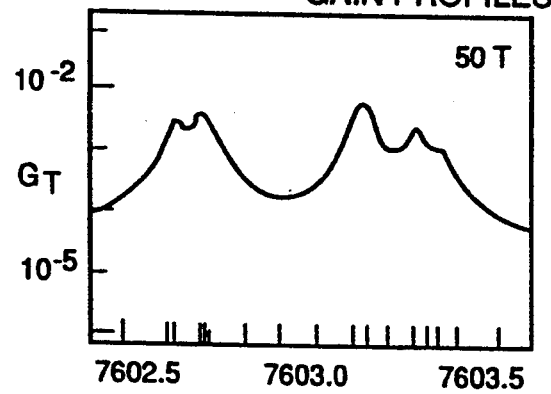
Figure 2F:
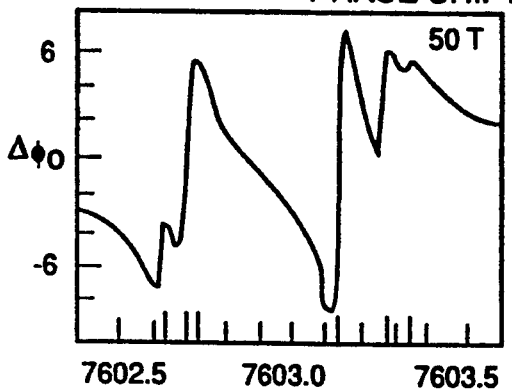

As FIG. 1 shows, there exists six hyperfine transitions which possess gains proportional to their A-coefficient listed in Table I. The very close spacing between these transitions, however, gives rise to significant anomalous dispersion effects. Previous analysis has shown that the strongest hyperfine transition, namely $F'=3$ to $F''=4$ experiences virtually no additional dispersive effects unlike the other five hyperfine transitions as FIGS. 4(a)–(f) illustrate. This situation forces the pulsed photolytic iodine laser to preferentially lase on its strongest transition and similarly minimizes any medium optical degradations. Consequentially, excellent beam quality would be expected from such a pulsed photolytic atomic iodine laser along with a single hyperfine transition. FIGS. 2(d)–(f) shows the additional phase shift per meter experienced at the different wavelengths while Table V shows the magnitude of these additional phase shifts. Via mode-media interactions and internal focusing of each of these hyperfine transitions, oscillation on only the dominant 3→4 hyperfine iodine transition should occur. The long coherence length verifies such conditions exists.

Another way of understanding anomalous dispersion effect is acquired by analyzing the internal gas lensing effect created by iodine anomalous dispersion. The results in Table V gives the refractivity values, n, for each of the hyperfine transitions for different pressure broadening values. Exciting the $C_3F_7I$ medium with UV radiation from both sides does not produce a perfectly uniform gain medium in the transverse directions. Most likely, a parabolic gain distribution results with the maximum near the UV transmitting windows. The refractive index, n(r), would then be $1+n_{hyperfine}$ where the subscript denotes one of the six iodine hyperfine transitions.

TABLE V

| | Phase Shifts $\Delta\phi$ (deg/m) and Refractivities $\Delta n$ per Meter Length for Iodine | | | | |
|---|---|---|---|---|---|
| $\Delta\nu$ (MHz) | 2-3 | 2-2 | 2-1 | 3-4 | 3-3 |
| 50 | −5.784 (−2.113) | −5.145 (−1.880) | 8.179 (2.988) | −0.5318 (−0.1943) | 3.177 (1.161) |
| 100 | −5.778 (−2.111) | −5.084 (−1.858) | 8.094 (2.957) | −0.5314 (−0.1941) | 3.177 (1.161) |
| 250 | −5.743 (−2.098) | −4.694 (−1.715) | 7.551 (2.759) | −0.5286 (−0.1931) | 3.178 (1.161) |
| 500 | −5.620 (−2.053) | −3.688 (−1.347) | 6.116 (2.235) | −0.5189 (−0.1896) | 3.182 (1.163) |
| 1000 | −5.192 (−1.897) | −2.005 (−0.7326) | 3.490 (1.166) | −0.4811 (−0.1758) | 3.182 (1.163) |
| 2500 | −3.608 (−1.318) | −0.9222 (−0.337) | 0.505 (0.184) | −0.2677 (−0.0978) | 2.978 (1.088) |

These refractivity value shown in Table V have both positive and negative values including either an internal concave or convex lens. It is very important to notice that the strongest hyperfine transition, $F'=3$ to $F''=4$, has a very small refractivity value relative to the other five transitions. Previously, such an internal lens has changed the resonator equivalent radius of curvature by 10-20% in a He-Ne laser. Similar effects exist with all the iodine hyperfine transitions except the highest gain transition. All of these other hyperfine transitions cannot be supported by the unstable confocal resonator. Therefore, only one hyperfine transition should be oscillating in a pulsed, photolytic iodine laser.

A repetitively pulsed, high energy, closed cycle iodine laser system 10 is shown schematically in FIG. 5(a) and comprises at least one laser gain cell 12 with a lasing medium 14 therein; thereabout are positioned UV flashlamps 16. An optical resonator 18 is placed on the gain cell 12 for outputting energy. The lasing medium 14 flows into a scrubber 20 which cleans the laser fuel after which the fuel flows into a turbo-molecular blower 22 which creates the necessary velocity.

Figure 7:
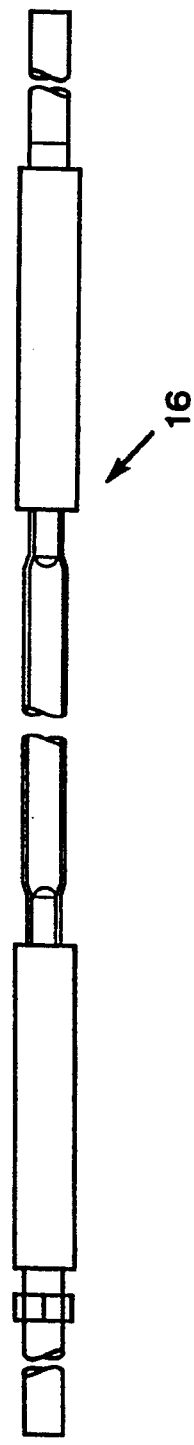
FIGS. 7(a) to (c) illustrate by schematic the flashlamps and the water cooling jacket whenever it is used.
Figure 7:
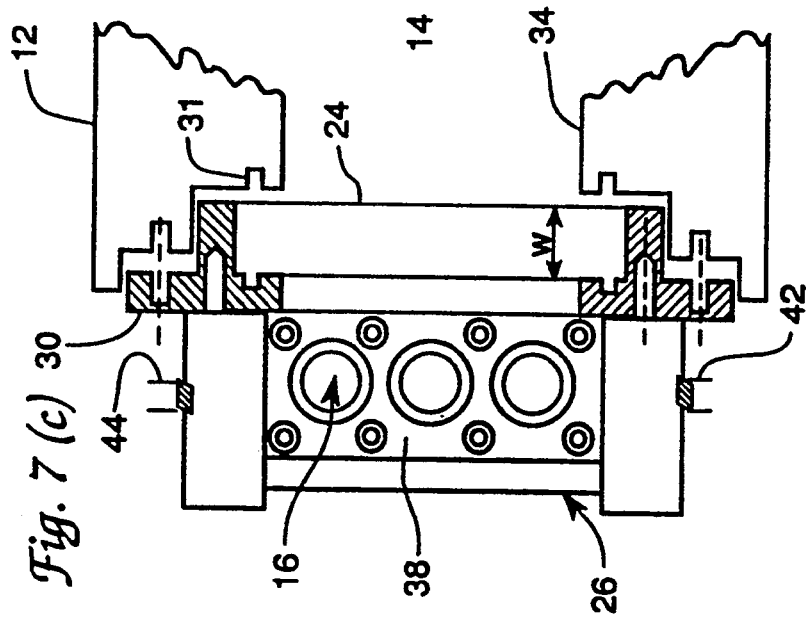
Figure 7:
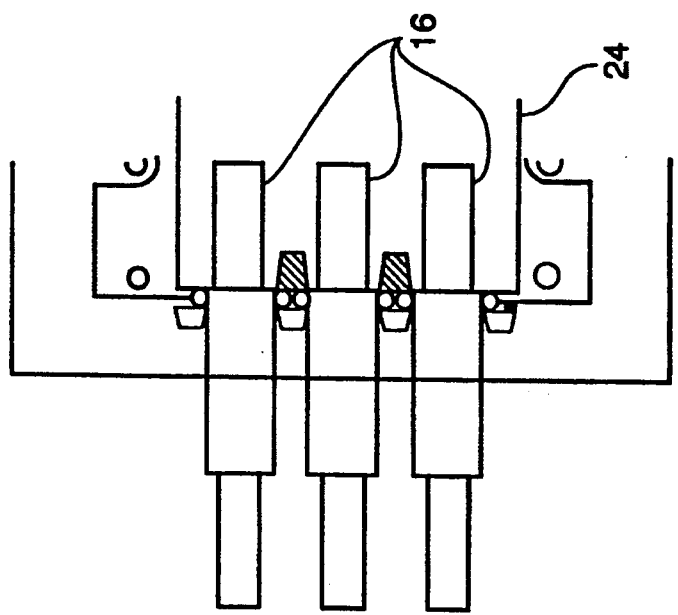

FIG. 5(b) shows the pulsed iodine laser system 10 consisting of two separate 125 cm long, 7.6 cm square gain cells 12 attached together each having 7.6 cm × 80 cm, 2.5 cm thick fused silica transmissive UV windows 24 on opposite sides. See FIG. 7(c) which illustrates a partial cross section through one gain cell showing one side with the flamplamps 16. The UV flashlamps 16 and reflectors 26 are illustrated in FIG. 7. At both ends of the gain cells 12 are the unstable resonator mirrors 28 FIG. 5(a), plus at one end, a 45° polarizing reflector, FIG. 13. Further a feedback mirror 27 is placed on $M_1$. These UV windows 24, FIG. 7(c), obtained from Corning Glass 7940 Grade F inclusion Grade 3 were free of OH radical to minimize the formation of color centers. Such centers can produce strong UV absorption in the fused silica during high intensity UV radiation. No such absorptions were experienced. A commercial polish existed on these UV window surfaces. Special attention was taken to seal these windows in such a manner that good vacuum integrity was assured, while minimizing the stresses on these quartz windows. FIG. 7(c) shows the details where a retainer stop 30 having a depth d is larger ($\cong 20$ mils) than the width w of the quartz window 24. This thickness difference, w<d, prevented excessive compression on the quartz. Also an O-ring 31 prevented this quartz windows 24 from making direct contact with the metal of the gain cells. These O-rings were only the length of the quartz windows 24 and on opposite sides. Due to the high UV intensity generated by the flashlamps, these latter O-rings had to be covered with a thin piece of Al foil. Failure to do this operation resulted in a black coating being deposited on the UV windows.

To minimize any possible non-uniformities in the spatial, integrated $g_oL$ values, these two separate gain cells 12 may be rotated 90° relative to their UV transmissive windows. The iodine gain region's cross section was 7.6×7.6 cm² with a total active excitation length of 150 cm. Mounted on opposite sides of the gain cells 12, less than 0.5 cm from the UV windows 24 were three pulsed Xe flashlamps, FIG. 7(a), equally spaced across the 7.6 cm width as shown in FIG. 7(b) and (c). There was a total of twelve lamps exciting the 8.7 liter laser gain region. The entire gain cell 12 was fabricated of aluminum which has been established to have negligible reaction with the $C_3F_7I$.

For the stable resonator and Rigrod saturated/transmission tests plus the iodine gain medium interferometric diagnostics, anti-reflection (AR) flat windows were used. At both ends of the combined iodine gain cells 12, 1.315 $\mu$M AR (anti-reflection, <1%) coated 2.5 cm thick, $\lambda/10$ at 632.8 nm, 6 inch diameter BK-7 glass windows 32, shown in FIG. 13 as one gain cell, sealed with Viton O-rings were used to separate the gain cell from the external environment.

Due to the large integrated gains ($g_oL$) produced in this iodine gain cell 12 special procedures had to be taken to eliminate parasitic oscillations. First, the Al internal walls 34, FIG. 7(c), were bead blasted with 10 mesh $Al_2O_3$ "chunks" to create a 80-100 mesh equivalent surface texture for minimizing the parasitic oscillation off the Al walls at low incident angles. On the UV window surfaces, a 50 mil high, octagon aluminum fence 36, FIG. 14, similarly minimized any parasitic oscillation.

Figure 8:
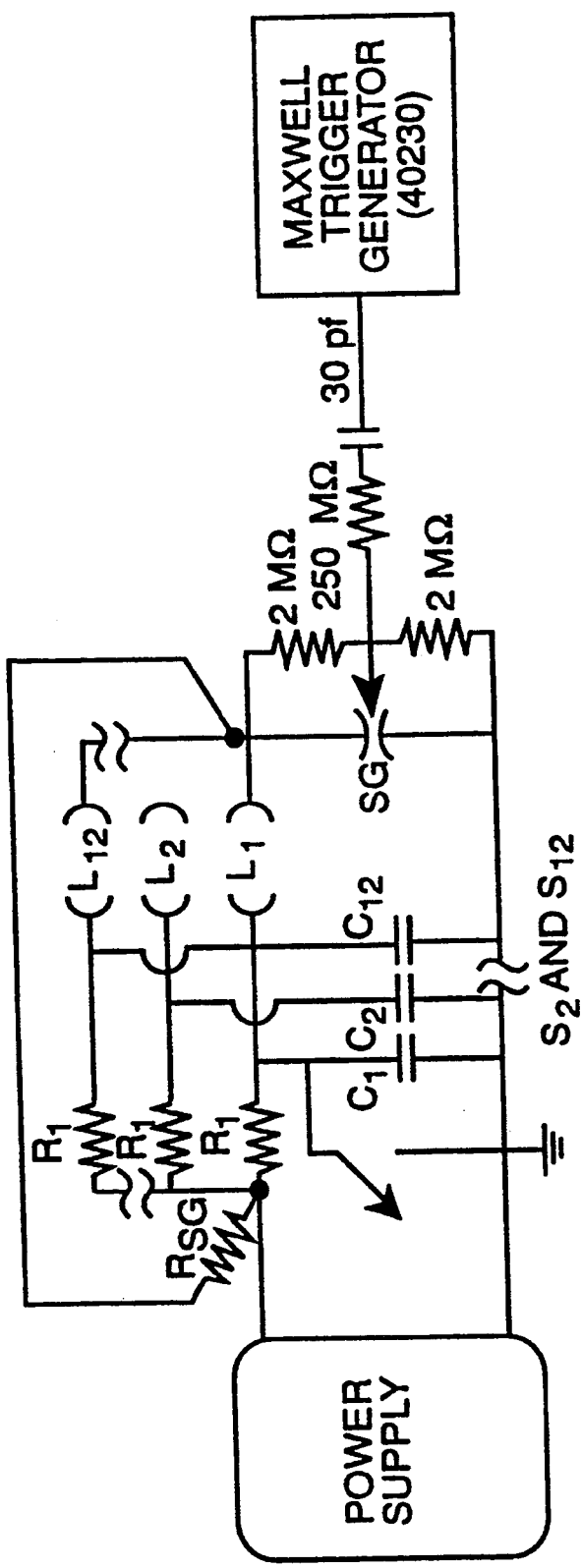
FIG. 8 illustrates the flashlamp pulse circuitry.

The Xe flashlamps 16, FIG. 7(a), used to excite the iodine gain medium 14 were 1 cm i.d., 1 mm or 2 mm wall thickness, quartz tubes filled with 150 torr of pure xenon gas and acquired from ILC Corp. The thicker walls of 2 mm gave greatly prolonged lifetime for the flashlamps. The titanium doped quartz walls enabled the water cooled flashlamps 16 to output but at a decreased (<30%) laser output relative to the air-cooled flashlamps. Cooling water was input into a flashlamp chamber 42 via inlet 44 and outlet 42, FIG. 7(c). The 220 nm cutoff for this latter quartz tube is believed to reduce the dissociation of water causing UV absorption resulting in the reduced laser output. These lamps had thoriated tungsten alloyed electrodes which were insulated to 40 KV using silicon sealed coaxial cylindrical aluminum tube surrounding the teflon protected cable/electrode connector as shown in FIG. 7(a). Such a grounded outer shield enabled the flashlamps 16 to be sealed to the water cooling reflector jackets with Viton O-rings as shown in FIGS. 7(b),(c). Such O-rings allowed the flashlamps to expand or vibrate during repetitive operation thereby minimizing mechanical stresses on the lamps. Each flashlamps was excited with separate 3.6-3.8 $\mu f$ capacitors charged to 15-30 KV and switched with a single, modified Maxwell spark gap (SG), M/N 40359 shown in FIG. 8. As shown therein, $C_1$ was 3.7 microfarads at 30 kV with $R_{SG}$ equal to 10 Mega ohms. This modified spark gap had an electrode spacing giving a operating voltage range from 10–35 KV, a maximum peak current of 350 KAmp, internal inductance less than 100 nanohenries, and a maximum charge transfer of 10 coulombs. A high voltage trigger from a Maxwell Trigger Generator 40230 ($-70$ KV pulse) was used to trigger this spark gap switching all of the twelve lamps simultaneously. This negative 70 KV pulse relative to the positive 15–30 KV voltage on the capacitors created a large voltage difference across the SG and thus made it fire very reliably. Operating with a $+70$ KV pulse produced less reliable results and more variations in the pulse initiation. To achieve reliable operation of the SG, the output of the high voltage power supply was connected to this spark gap through a 100 M$\Omega$ resistor ($R_{sg}$) to assure complete ionization of the spark gap during its triggering by the Maxwell unit. Typical dry air pressures inside the SG were psia at 15 KV, 20 psia at 25 KV, and 22 psia at 30 KV. The midplane of the SG was maintained during the discharges by using a 100 M$\Omega$ shunt resistor to each electrode. The temporal behavior of the flashlamp's currents were monitored using Pearson current transformer M/N 1025 coupled to a Tektronix 11401 digitizing oscilloscope. Each of these capacitors were connected to a high voltage, normally closed, remote controlled shorting switch connected to the safety interlock of the A.L.E. Systems, Inc. power supply M/N 302L "master" and five M/N 302S "slaves". Another remote controlled high voltage, normally closed switch, Jenning switch was also used to insure the no high voltage from the power supply could accidentally be initiated.

Figure 9:
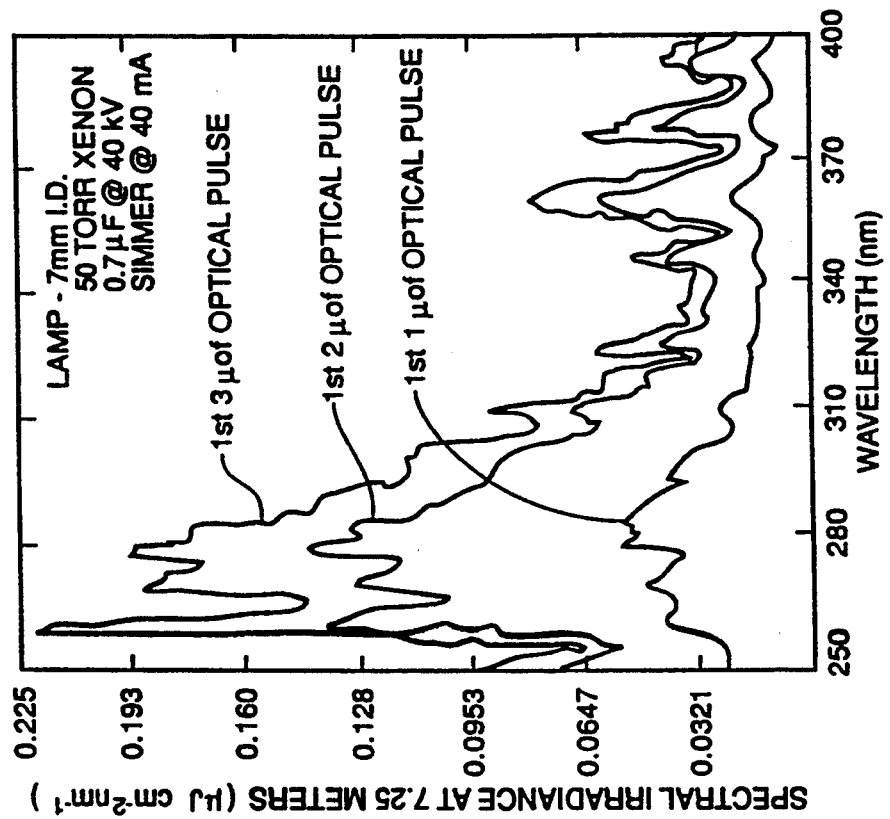
FIGS. 9(a) to (c) illustrate the pertinent physics of UV flashlamps and the coupling of energy to the iodine gain medium.
Figure 9:
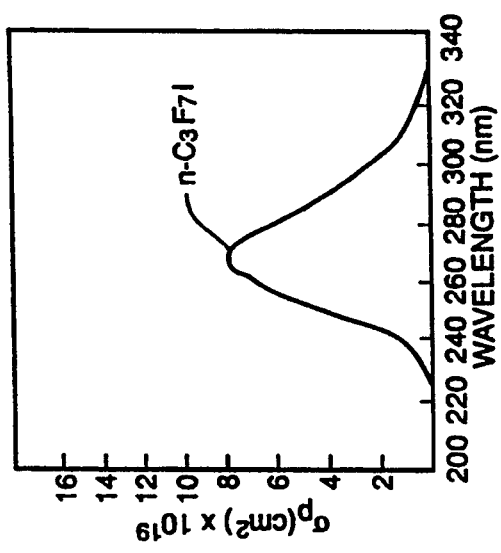
Figure 9:
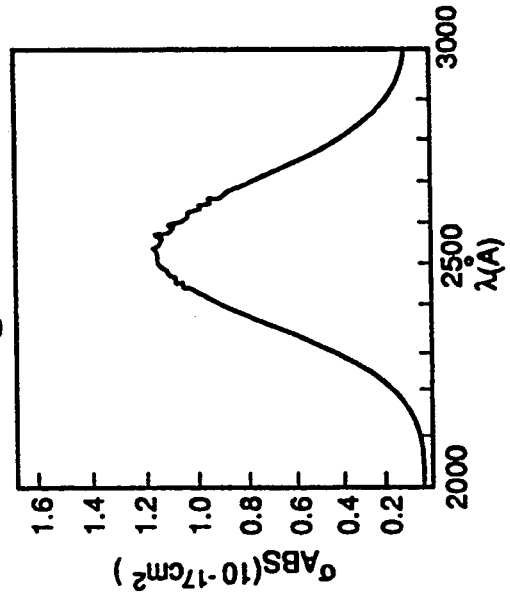
Figure 11B:
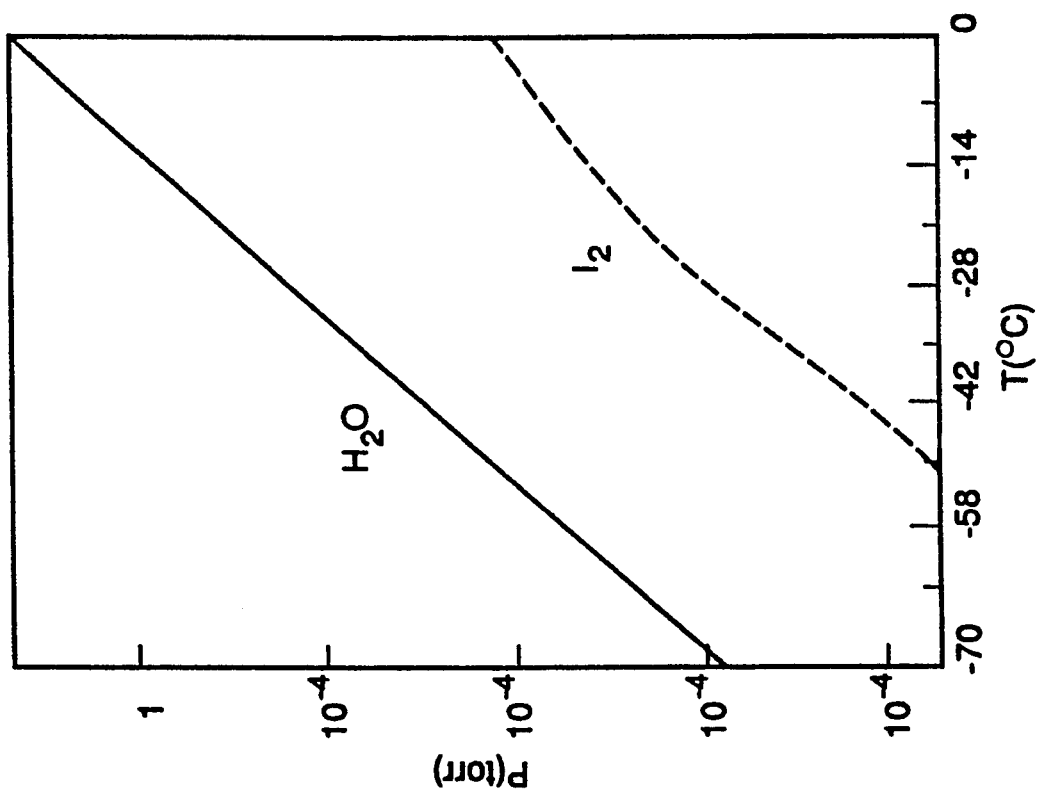
FIGS. 11(a) and (b) illustrate the vapor pressure curves for species important in long term operation of photolytic iodine lasers.
Figure 11A:
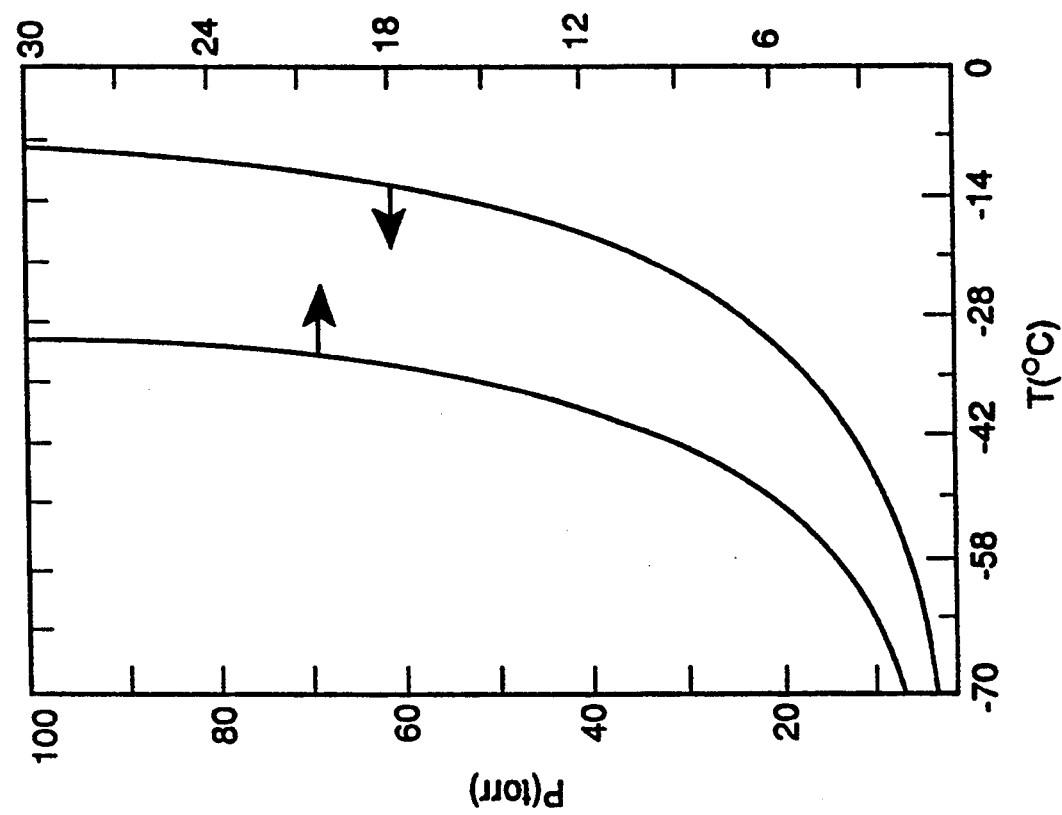

To acquire short pulsewidths near 10 $\mu$sec, it was necessary to excite the flashlamps at very high power levels in excess of 300 MW with peak plasmas deposited energies greater than 1.7 Kjoules. At these high deposited energies in such short times, however, the flashlamp lifetime (shots before destructively failing) becomes quite short. In addition, the intense UV radiation produced significant ozone ($O_3$) in the region near the flashlamps. $O_3$ absorption very closely overlaps the $C_3F_7I$ photolytic absorption band as seen by comparing FIGS. 9(a),(b). The formation of most of the ozone occurs after the flashlamp pulse and thus air convection was necessary. A calculation on the operating parameters of such flashlamps with these very high power/energy loadings provides valuable insight into the requirements of liquid water cooling. Using established techniques to characterize flashlamps, the following two relations must be used:

$$\text{Life(flashes)}=(E_o/E_x)^{-8.5} \quad E_x=14202 SdT^{\frac{1}{2}} \qquad (5)$$

where $E_o$, $E_x$, T, d, and S are respectively the lamp deposited discharge energy (joules), the explosion energy (joules), the time constant of the electrical lamp circuit (equals $\frac{1}{3}$ the pulse duration—seconds—defined by $T=(LC)^{-1}$), the lamp bore diameter (cm), and the lamp length (cm). The lamp lifetime is defined as the average number of pulses to 70% of the original UV output. The first relation between the lamp life and ($E_o/E_x$), respectively, have values of $(0.58)10^2$, $(0.34)10^3$, $(0.34)10^4$, $(0.34)10^5$, and $(0.34)10^6$ indicating that the larger the ratio of lamp discharge energy to the lamp's explosion energy, the less number of flashes the lamp can sustain before failing catastrophically. Referring to the flashlamp geometry of FIG. 7(a), d=1 mm and S=80 cm. For a pulsewidth of approximately 12 $\mu$sec, T=4 $\mu$sec and thus the lamp's explosion energy becomes $E_x=2.27$ Kjoules. With the 3.6–3.8 $\mu$f capacitors charged to the maximum 30 KV used, $E_o=1.71$ Kjoules making the ratio ($E_x/E_o$) equal to 0.75. From the above lamp life versus ($E_x/E_o$), the lamp should last less than 100 shots. For repetitive operation, such condition is unacceptable. Consequently, some for of liquid cooling of the flashlamp is recommended. Water is one option but decreased laser energy is obtained due to transient UV absorption.

In the water cooling shown in FIG. 7(c), deionized water with a resistivity greater than 10 M$\Omega$ was necessary in order to eliminate any photodeposition of a metal film on the flashlamp outer walls. Obviously such depositions greatly decreased the laser output. A Neslab CFT-75 cooler was used to circulate the deionized water through the water jackets at approximately 1.5 gallons/minute. To minimize condensation the $I_2$ molecular photolytic by-product, the water was retained at a slightly higher than ambient temperature, 30°–35° C. This water flow rate did not produce any other mechanical vibrations causing decreased optical quality of the laser output beam quality.

To the non-cavity side of the flashlamps, a reflector 26 was placed to reflect UV radiation into the iodine gain region. Small enhancements were observed. Different types of surfaces were placed on these flats with polishing appearing to be the best. FIG. 10 shows the UV reflectivity differences between two types of aluminum finishes, "freshly" deposited and polished aluminum. Although there is significant differences, the fairly quick oxidation of "freshly" deposited Al films change to that of FIG. 10(b). Special coatings were used but most of them will not be able to withstand the extremely high UV intensity generated by the flashlamps. Coatings with a $SiO_2$ overcoating seem to work quite well but $BaSO_4$ looked best.

As a result of the above requirements, an impurity free $C_3F_7I$ gas at a fixed high pressure and constant high flow velocity is provided. Previously, a completely passive closed-cycle flowing alkyl-iodide ($C_3F_7I$) gaseous supply system was reported which provided a high purity and fixed low pressure of gaseous $C_3F_7I$ at a slow flow velocity (1–2 m/s). This system was used to operate a cw photolytic atomic iodine laser with virtually unlimited operating time. Although this passive system performed very well with cw atomic iodine lasers, much higher flow velocity in excess of 10 m/s were required for the repetitively pulsed iodine laser.

$C_3F_7I$ has unique chemical properties which enables it to operate in a closed cycle flowing systems with relatively easy removal of the photolytic by-product $I_2$ by condensing all of the $C_3F_7I$ in the iodine ($I_2$) removal system.

Figure 6:
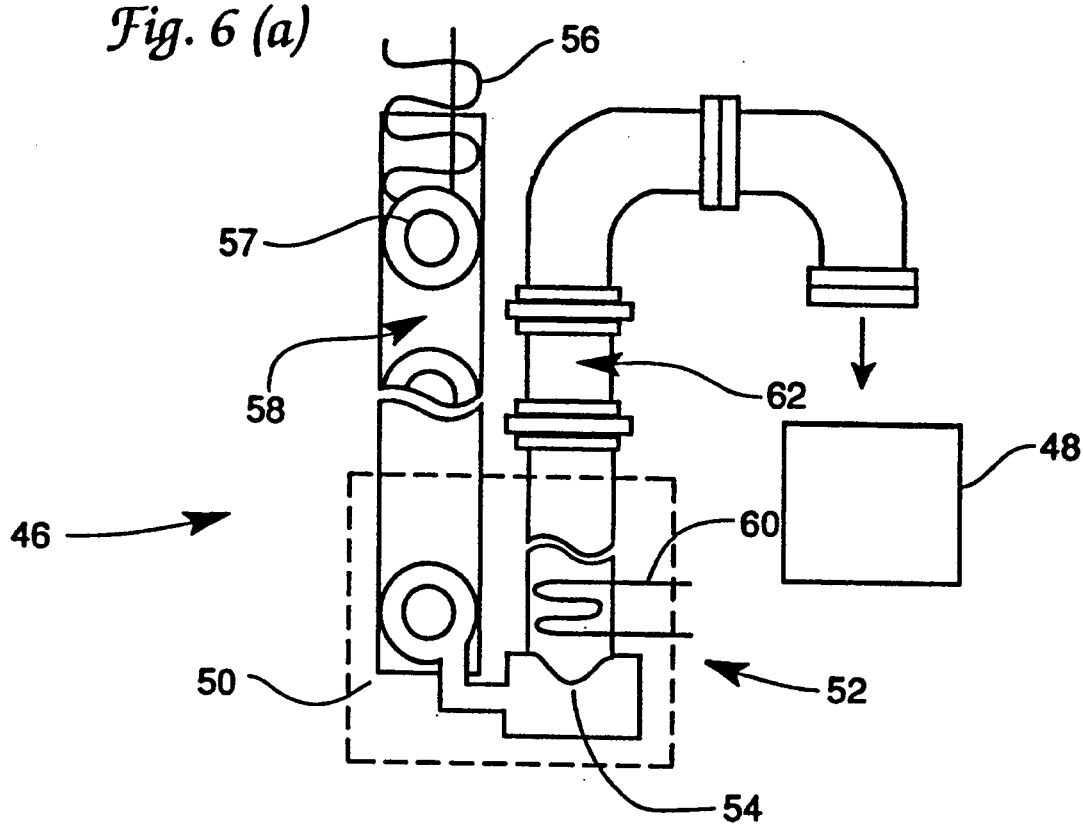
FIGS. 6(a) and (b) illustrate $C_3F_7I$ iodine ($I_2$) removal system with the condenser and evaporator sections and a turbo-molecular blower.
Figure 6:
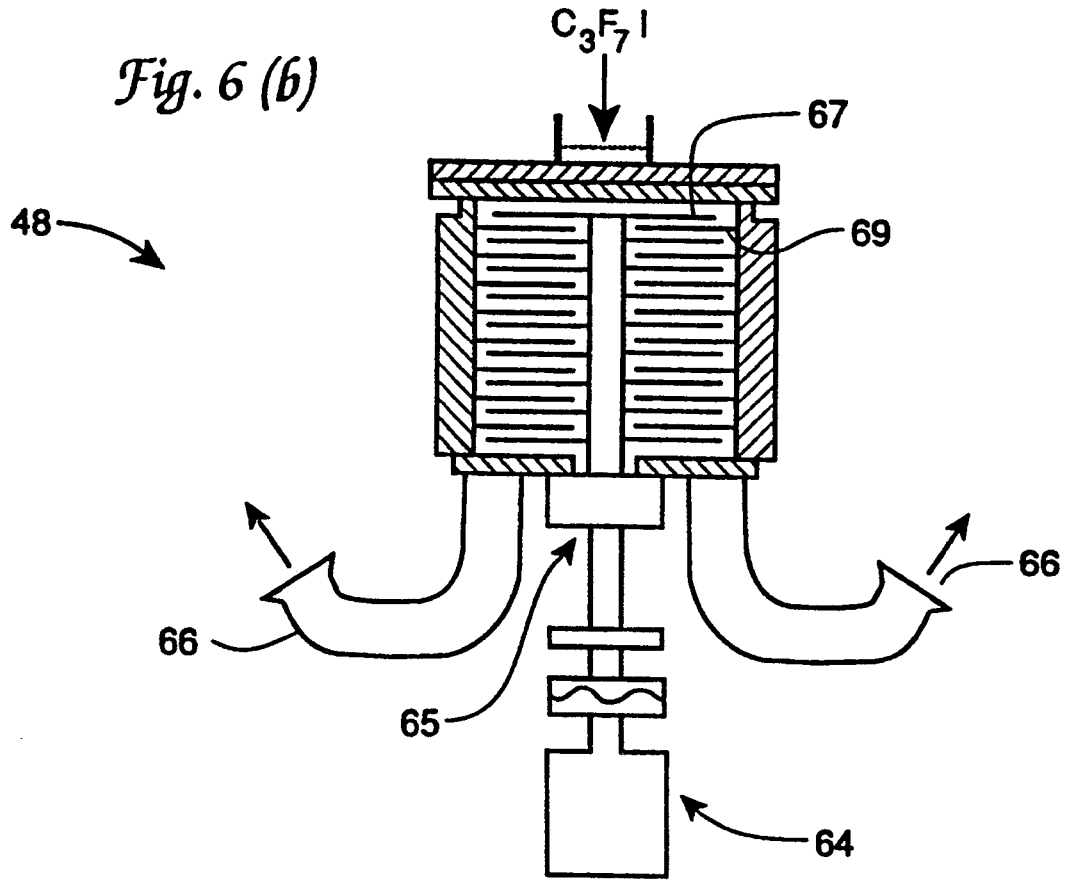

FIG. 6(a) and (b) show schematics of a closed-cycle, $C_3F_7I$ iodine ($I_2$) removal system 46 integrated with a turbo-molecular blower 48 to create the large flow velocity required. The removal system 46 consists of a condensor 50 and an evaparator 52 with evaporator cooling coils 60 operating from about $-15$ to $-30$ degrees C. cooled to different temperatures and coupled with a stainless steel tube. All components were made of stainless steel to minimize temperature drifts and both the condensor 50 and evaporator 52 were encased in insulated jackets to reduce heat transfer. The quantity of liquid $C_3F_7I$ was sufficient to assure its liquid level was above the orifice connection between these. Approximately 1 Kg of $C_3F_7I$ was required and sustained reliable lasing for several weeks. This liquid 54 isolated the two cells and forced gaseous $C_3F_7I$ to flow from the evaporator to the condensation zone via an external path, namely the laser gain cell 12, not shown, even without the blower discussed below. Referring to the left side of FIG. 6(a), (the condensor side), from the top where the iodine gain cell's $C_3F_7I/I_2$ gas "exhaust" enters the iodine ($I_2$) removal system 46, there exists approximately one foot of stainless steel (s.s.), 0.5 inch o.d. tubing, 3" diameter helical coil 56 with 1 turn inch, and 1 foot long. This s.s. tube was welded to a 1" diameter APC flange sealed with an O-ring to the 4" diameter s.s. pipe. Denatured alcohol (95%) cooled to temperatures from $-40°$ to $-60°$ C. by a Neslab model ULT-80 refrigerated circulation bath typically flows through the helical coil 56. Once the $C_3F_7I/I_2$ impinges upon the coil 56, it is liquified along with the $I_2$ being dissolved in the liquid $C_3F_7I$ or solidified on the helical coil. Any solid $I_2$ not dissolved in the liquid $C_3F_7I$ is literally washed off these coils as verified by observing these coils after the pulsed laser was turned off. This liquified $C_3F_7I/I_2$ solution next passes through a fine copper wool, mesh 58. Such Cu wool reacts with the $I_2$ forming CuI. Any $I_2$ still not removed is then deposited as either a solid or dissolved in the liquid $C_3F_7I$. On the right side of FIG. 6(a) is the evaporative region maintained at a temperature greater than the condensor from which clean $C_3F_7I$ is liberated with negligible $I_2$ vapor. This evaporator temperature was established by a 5 inch long s.s. coil 60 similar to that in the condensor section. Again, denatured alcohol controlled by a Neslab cooler LT-50 at temperatures of $-30°$ to $-15°$ C. was used. The remaining $I_2$ vapor is then retained in the liquid $C_3F_7I$ where it is reacted with the Cu wool mesh 62 above the evaporative side of the iodine ($I_2$) removal system. During operation, the temperature of both the evaporative and condensative baths controls the $C_3F_7I$ pressure in the iodine gain cell.

Figure 12:
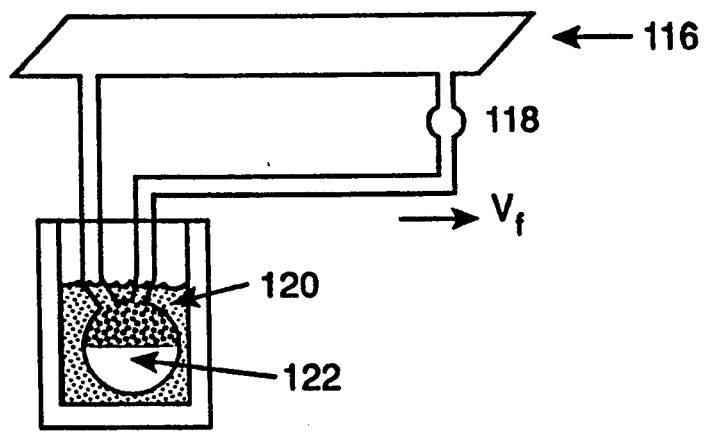
FIGS. 12(a) to (c) illustrate alternative modes for $C_3F_7I$ closed cycle iodine ($I_2$) removal/laser fuel systems.
Figure 12:
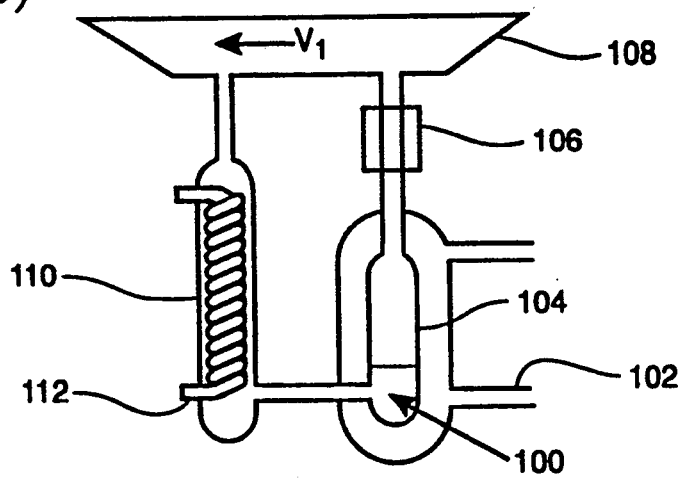
Figure 12:
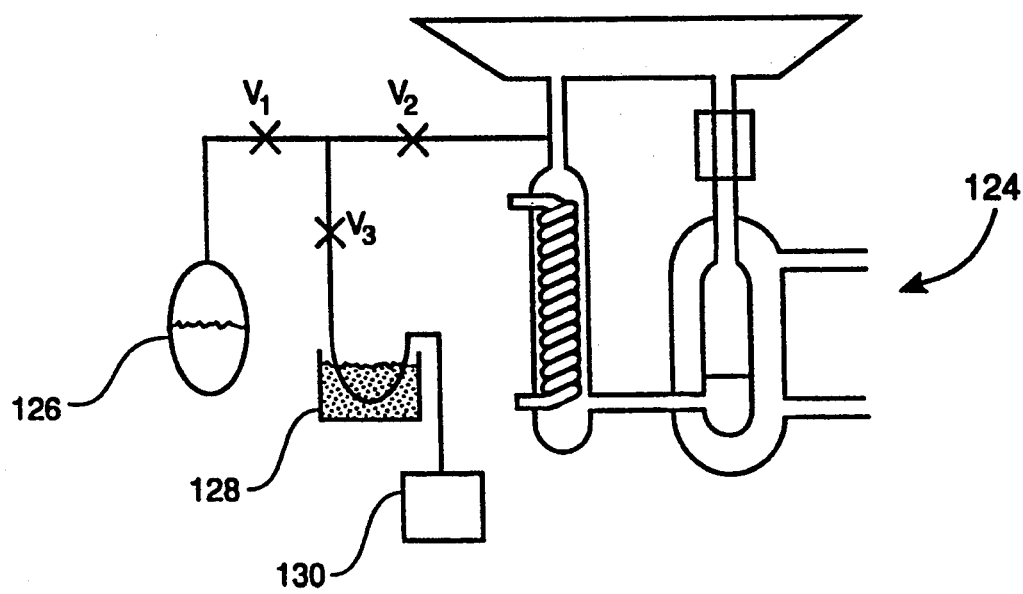

The passive systems described above and illustrated in FIGS. 12(a)-(c) can only create a 1-2 m/sec flow velocity. In FIG. 12(a), liquid $C_3F_7I$ and $I_2$ and other photolytic products 122 are within a cooling medium 120 such as to produce a pressure of 70 torr of $C_3F_7I$ at $-15$ degrees C. This gas flows at a velocity $V_f$ through a pump 118 into a laser tube 116 and then returns to be liquified. As seen in FIG. 12(b), liquid $C_3F_7I$ 100 is vaporized by a 20 degree C. coolant input at 102 into an evaporative cell 104. The gas flows through a venturi tube 106 into a transverse laser cell 108 then into a condensation cell 110 having a $-40$ to $-60$ degree coolant input at 112 for changing the gas to liquid. FIG. 12(c) shows a further modification of FIG. 12(b) wherein a closed cycle system 124 has a liquid $C_3F_7I$ reservoir 126, a liquid nitrogen trap 128, and a forepump 130 controlled by valves $V_1$, $V_2$, and $V_3$. To overcome this limitation, a turbo-molecular blower 48 must be used to create $C_3F_7I$ at flow velocities greater than 10 m/s while operating at relatively low pressures of 20-60 torr. Because $C_3F_7I$ is a very massive molecule, being 296 amu, a special blower is required. Prior non-contaminating blowers were initially examined such as piston drives and centrifugals. None of these pumps could simultaneously produce the flow velocity and sustained operation with such a heavy molecule. The use of a modified turbo-molecular pump as a blower 48, FIG. 6(b), provided the necessary flow velocity and sustained operation. Large pressure compressions are obtained by using wedge rotors 67 concentric with similar stators 69 as shown and rotating the well balanced rotor blades at 2000-3000 rpm. The resulting pressure compression of 10-100 create a large enough pressure head that high flow velocity result. To create non-contaminated oil, vacuum environment, a ferrofluidic M/N SC-1000-C rotating vacuum seal 65 was used. An alignment bearing around the rotor shaft was driven by a 2 hp a.c. motor 69 rotating at 3400 rmp. The diameter of the rotors and stators were 16". The turbomolecular blower was originally an Airco Corp. M/N 1514 operating at 20,000 rpm. At the bottom compression side of the blower 48, FIG. 6(b) two exit ports 66 which provide $C_3F_7I$ at flow velocities greater than 10 m/s to both ends of the iodine gain cells 12. The flow velocities were initially measured using a 1 inch Vortex flow meter, M/N YF102.

In characterizing the performance of this pulsed photolytic iodine laser 10 both stable and unstable resonators were used. With a stable, hemispherical resonator having AR coated flat windows, the Rigrod gan-saturation curves were obtained. This resonator had 6" diameter mirrors, a 10 meter radius of curvature and flats with transmissions of 10, 20, 30, 40, 50, 60, 70, 80, and 100%. Nominal mirror spacing was 3.0 meters. It is beneficial to note that 1.315 $\mu M$ coated mirrors also have reflectivities at wavelengths between 420-460 nm. These high reflectivities made the 1.315 micron resonator mirror alignment with an Ar+$-458.9$ nm or HeCd+$-441.6$ nm laser quite easy. From the gain-saturation data obtained with this hemispherical stable resonator, the optimum confocal, unstable resonator magnification was established.

For most large volume laser gain medium having nearly uniform gains and square or circular geometry, the confocal unstable resonator yields a collimated laser output with the fractional output coupling dictated by the magnification. Besides a collimated laser beam, the optics are relatively easy to fabricate. Confocal unstable configured resonators have two types, namely positive and negative branches. The latter produces a focus internal to the mirrors while a positive branch unstable resonator does not. Because of the high internal cavity power present in this iodine gain medium, no internal focus was desired and thus the positive branch mode was chosen. For the positive branch, unstable confocal resonator, the critical parameters are:

$$g_1 = \frac{M+1}{2} \quad g_2 = \frac{M+1}{2M} \quad R_1 = \frac{L}{1-g_1} \quad R_2 = \frac{L}{1-g_2} \quad (6)$$

where $R_1$, $R_2$, M, L, $g_1$, and $g_2$ are respectively, the mirror radius of curvatures, the magnification M $(=|R_2|/|R_1|)$, the mirror distance L $(=|R_1-R_2|)$, and resonator g parameters. The effective Fresnel number is $N_{eq}=N\times(M-1)/(2M^2)$. The geometrical equivalent output coupling $c_G=(M^2-1)/M^2$. In addition, the outer laser beam width, equal to the cavity width w, and the small feedback width a are related by $w=Ma$.

Figure 13:
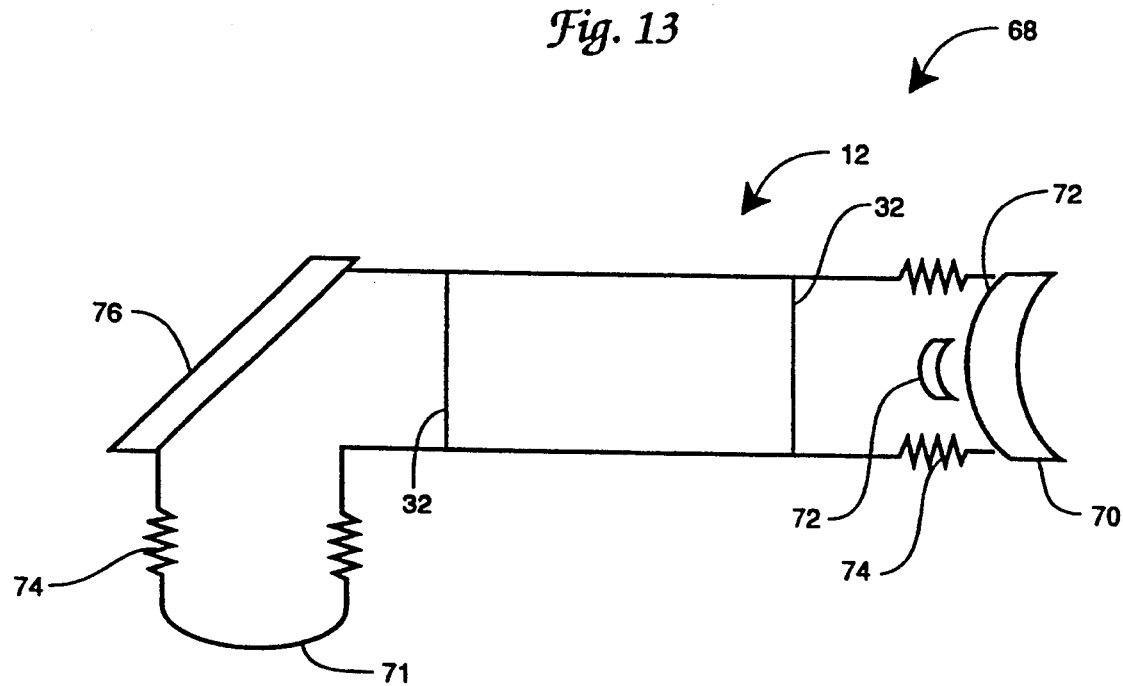
FIG. 13 illustrates the unstable, confocal resonator incorporating square feedback reflecting coating at 1.315 microns.

FIG. 13 shows a confocal resonator 68 employed in the pulsed photolytic iodine laser 10. Transmissive coupling is used for coupling. At 1.315 microns, the laser mirror substrates can have excellent transmissive properties. Here, BK7 substrates were used. Such low absorption of laser radiation at this wavelength relates to negligible mirror heating and thus no noticeable aberrations to the mirror surface. FIG. 13 shows a feedback mirror 70 as a meniscus mirror, i.e., having different radii of curvature on the front and back surface. The front surface (meaning looking at it from inside the cavity) is convex as is the back mirror surface. On its front surface was placed an AR coating at 1.315 microns following by a square feedback mirror 72 with a maximum reflecting coating at 1.315 microns. This square reflecting coating was centered on the square 7.6×7.6 $cm^2$ iodine gain cell 12 and had a width w such that the relation Ma=7.6 cm was satisfied as dictated by the above condition. Rigrod gain-saturation data showed that approximately 90% output coupling is optimum corresponding to a magnification M=3. Dictated by the gain cell 12, mirror bellows 74, and a polarizing turning flat 76, the mirror spacing was required to be 2.85 meters. From the above confocal resonator relations, the two mirror radius of curvatures became −2.73 and 8.41 meters with a square feedback width of 2.35 cm. The exact magnification was 3.08.

On the back side of the meniscus mirror 70, the radius of curvature was −2.78 meters. This different radius of curvature accounted for the refractive index bending of the laser radiation as it propagated through the BK7 substrate. Including this different curvature on the back surface assured the laser output beam was collimated. To minimize any reflections from this surface, an AR coating was deposited. On the opposite end of the resonator was the 45° angle reflecting flat 76 coated for maximum reflectivity of p-polarized radiation and less than 10% for s-polarization. For round trip propagation, only p-polarized lasing was output. This last operation was necessary since an unstable resonator with no internal Brewster windows or turning flats have no polarization selectivity. The p-polarization coating on this flat mirror assured very good control.

The bellows 74 on both ends of the gain cells 12 allowed exact spacing control to assure collimated laser output plus allowing easy mirror alignment. These stainless steel mirror boxes 78, FIG. 5(b), used a double concentric screw adjust to insure negligible movement during repetitive laser operation. As stated above, the iodine laser mirror's good reflection in the 420–460 nm region enabled either an AR+ or HeCd+ to be used for the alignment. To align the internally mounted mirror of the unstable resonator the 456>9 nm (Ar+) was injected into the cavity at the edge of the feedback coating of the convex (−2.7 meter) mirror collinear with the optical axis/line center through the gain cell's cross section. A small fraction of this alignment laser beam was transmitted through the 45° p-polarizing mirror to aid in the resonator alignment. Such collinear operation was required to assure correct alignment since the magnified beam width was 7.5 cm inside a 7.6 cm gain width as dictated by the w=Ma condition. Good optical alignment was achieved when the mirrors were aligned such that a square replica was produced outside the feedback/outcoupling mirror. During the early resonator alignment tests, it was noticed that allowing the concave (8.4 meter) mirror to be compressed into a specific position between a rubber and metal surface produced stress distortion on the mirror resulting in an aberrated far-field beam profile in both the alignment replica and the extracted laser output beams. Therefore, no optical surfaces were allowed to make any contact with solid surfaces.

Figure 14:
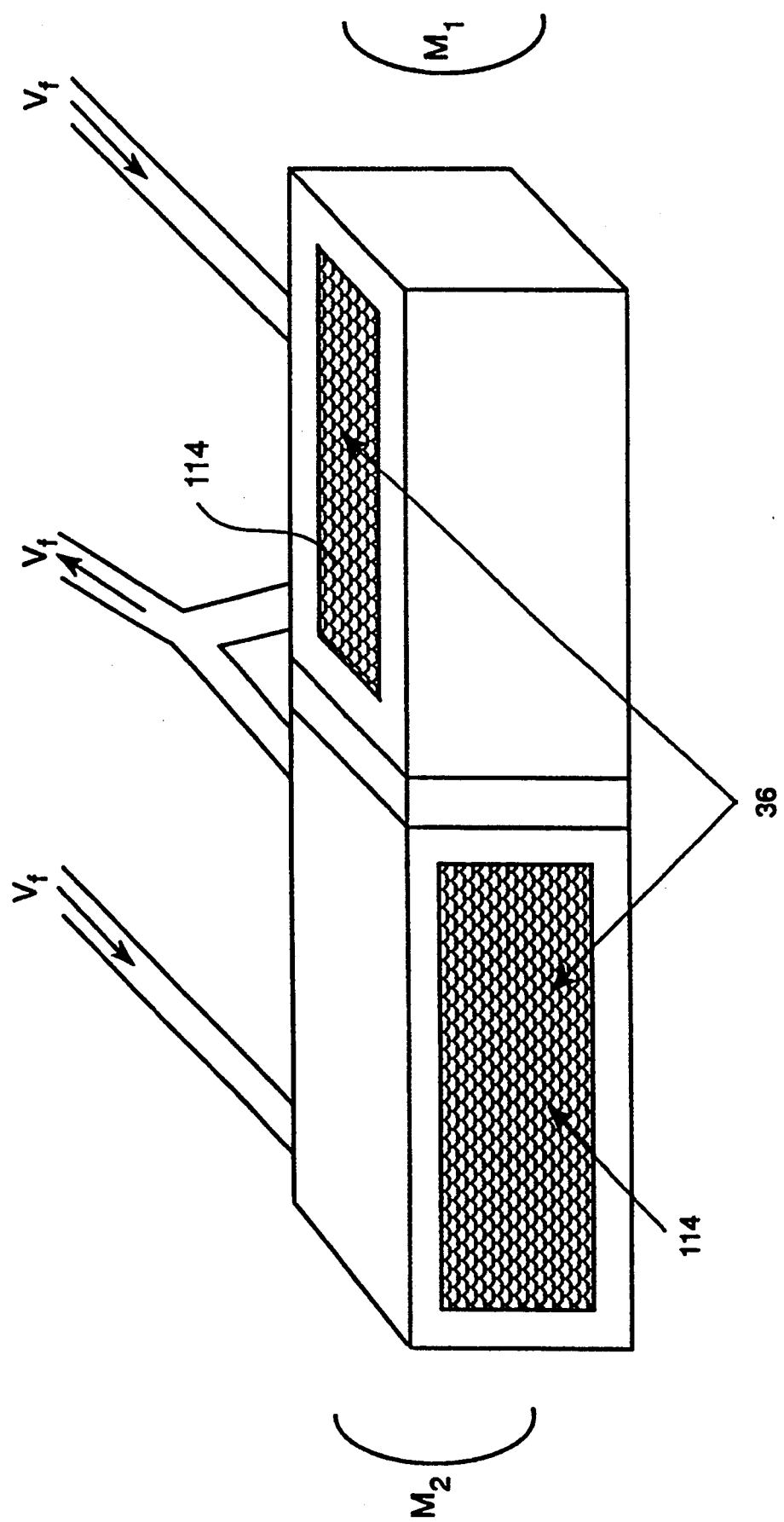
FIG. 14 illustrates by schematic a method used to provide parasitic control for the high gain, pulsed photolytic iodine laser.

Because of the very large gain-length products, $g_oL$, established in the iodine gain medium, much efforts was required to eliminate parasitic oscillations. Even with 100% outcoupling from one mirror of a hemispherical resonator, very significant, multimode laser output existed. Consequently, both of the AR coated windows had to be eliminated requiring all the optics to be internally mounted. The low angle reflections from the gain cavity Al walls and UV transmitting walls established parasitic modes. FIG. 14 shows the approaches taken to eliminate these parasitic oscillations. First, all the gain cell internal walls 34, FIG. 7(c), were roughed with large 10 mess $Al_2O_3$ fragments giving a 80–100 mesh surface texture. Next, the UV windows/flashlamps had a aluminum hexagon fence 36, FIG. 14, having a height of 50 mils and thickness of 10 mils. The optical fence prevented any low angle reflection from the windows. The transmission of UV radiation through this optical fence was greater than 98%. Both of these techniques successfully eliminated additional parasitics the lowest mode of the confocal unstable resonator was observed.

To produce an iodine laser with excellent beam quality, large coherence length, good polarization extinction, and short pulsewidth (7–12 micro sec) while operating repetitively, several different optical diagnostics were performed on the laser output. These were energy measurements, transient behavior, near and far-field laser beam profiles, interferometric medium diagnostics, laser beam collimation, coherence length, and polarization properties. Along with the laser device, all the diagnostics were placed on an air-floating optical isolation table.

Figure 15:
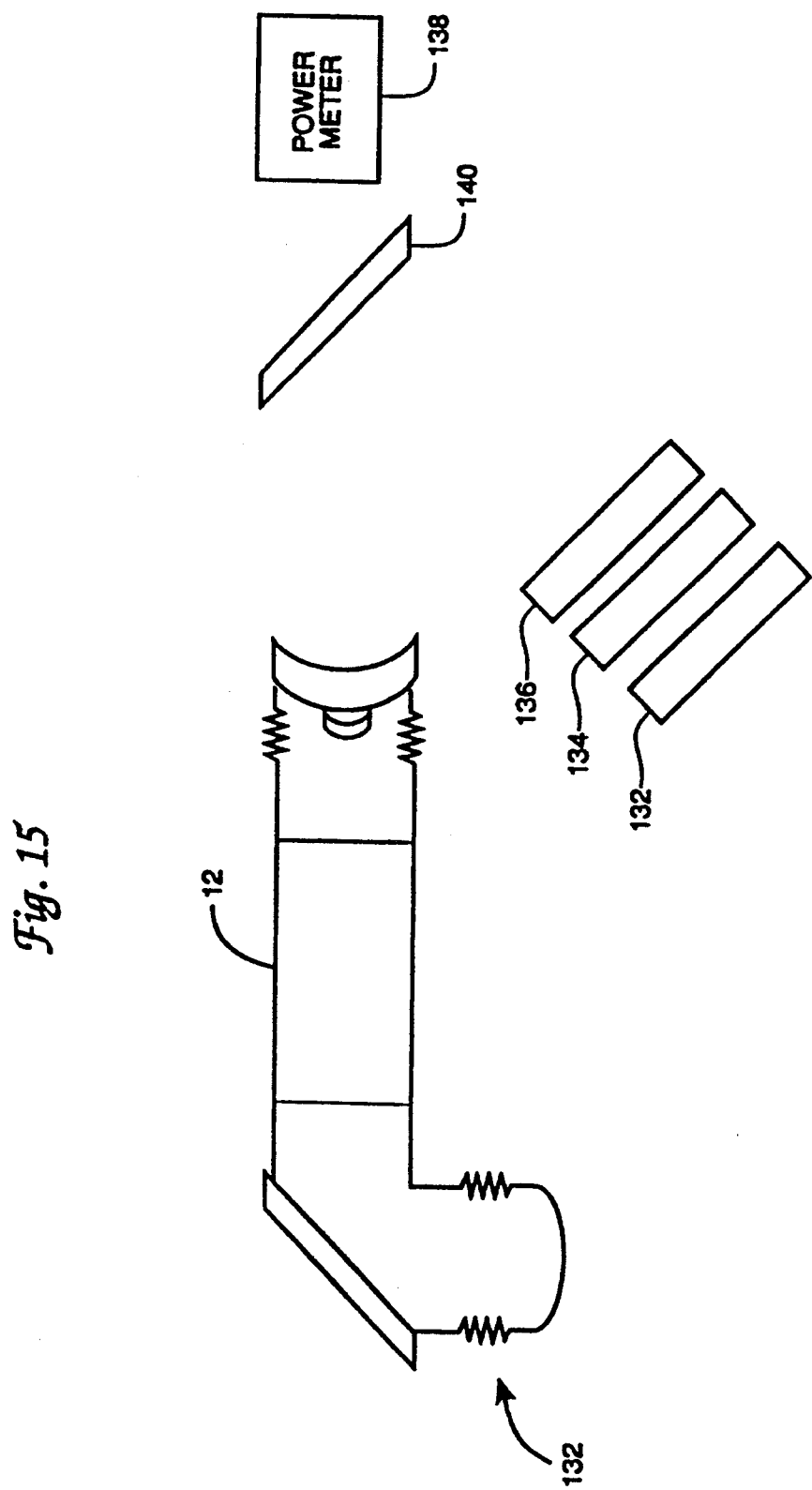
FIG. 15 illustrates apparatus used to acquire pulsed energy and average power measurements for repetitively pulsed photolytic iodine laser.

The laser pulsed energy and average power measurements were made using a Scientech M/N 380801 volume energy absorber shown in FIG. 15. The unit had a maximum energy and power rating of 10 watts/$cm^2$ or 300 joules and 100 watts, respectively. The output of this volume absorber meter was connected to a Hewlett-Packard M/N 7100 B strip chart recorded for permanent recording inside of a screen room where all of the electronic processing was performed. The entire system was calibrated using the external, pulsed capacitor exisiting internal to this Scientech unit. Transient laser behavior was monitored with a Judson germanium photodiode M/N J16 observing either the small transmitted laser energy from the high reflector mirror of the stable resonator or 45° p-polarizing mirror of the stable resonator. A 1000 micron quartz fiber optics placed on the edge of laser beam transmitted a fraction of the laser energy into the screen room. The resulting laser pulses were then recorded on a Tektronix 11401 digitizing oscilloscope along with the flashlamp current pulses. For synchronous triggering, the sync signal from the Maxwell pulser was used to establish the onset of lasing relative to the initiation of the flashlamps.

To perform the iodine gain measurements, a low power (few milliwatt), well stablized cw atomic iodine laser was used. This laser was excited with a stablized d.c. arc lamp using a 10 $\mu f$ parallel capacitor and a series 10 henry inductor. Such stabilization enabled this cw laser to be used in the high electromagnetic interference (emi) region of the pulsed iodine device with negligible laser output variations. Consequently, noiseless laser gain measurements could be obtained. To acquire iodine gain medium optical quality assessments, a standard Mach-Zehnder interferometer was employed using an Ar+ at 514.5 nm. Operating at this wavelength was critical due to the $I_2$. The resulting fringes were monitored both visually and with a Hamasatsu M/N C2741 camera sensitive from 400 nm to 2M having 240×240 pixels in approximately 1 cm². The output from this camera was processed by a KSI time code annotator and then displayed and permanently recorded with a Panasonic VCR. To monitor the relative pulse-to-pulse laser energy along with the average power during operation at 0.5 $H_z$, the experimental arrangement of FIG. 15 was followed. Although a stable 132 resonator is depicted, it equally applies to the confocal unstable resonator also. Here, a small fraction of the laser energy is reflected into a Gentec ED500 photodetector through a UV blocking, transmissive iodine filter 136 at 1.315 micron and then a quartz diffuser 134 to eliminate any possible "hot spots" on the GenTec photodetector 132. This arrangement enabled simultaneous laser energy/pulse and power measurements with the use of a beam splitter 140 allowing power measuring by power meter 138.

Figure 16:
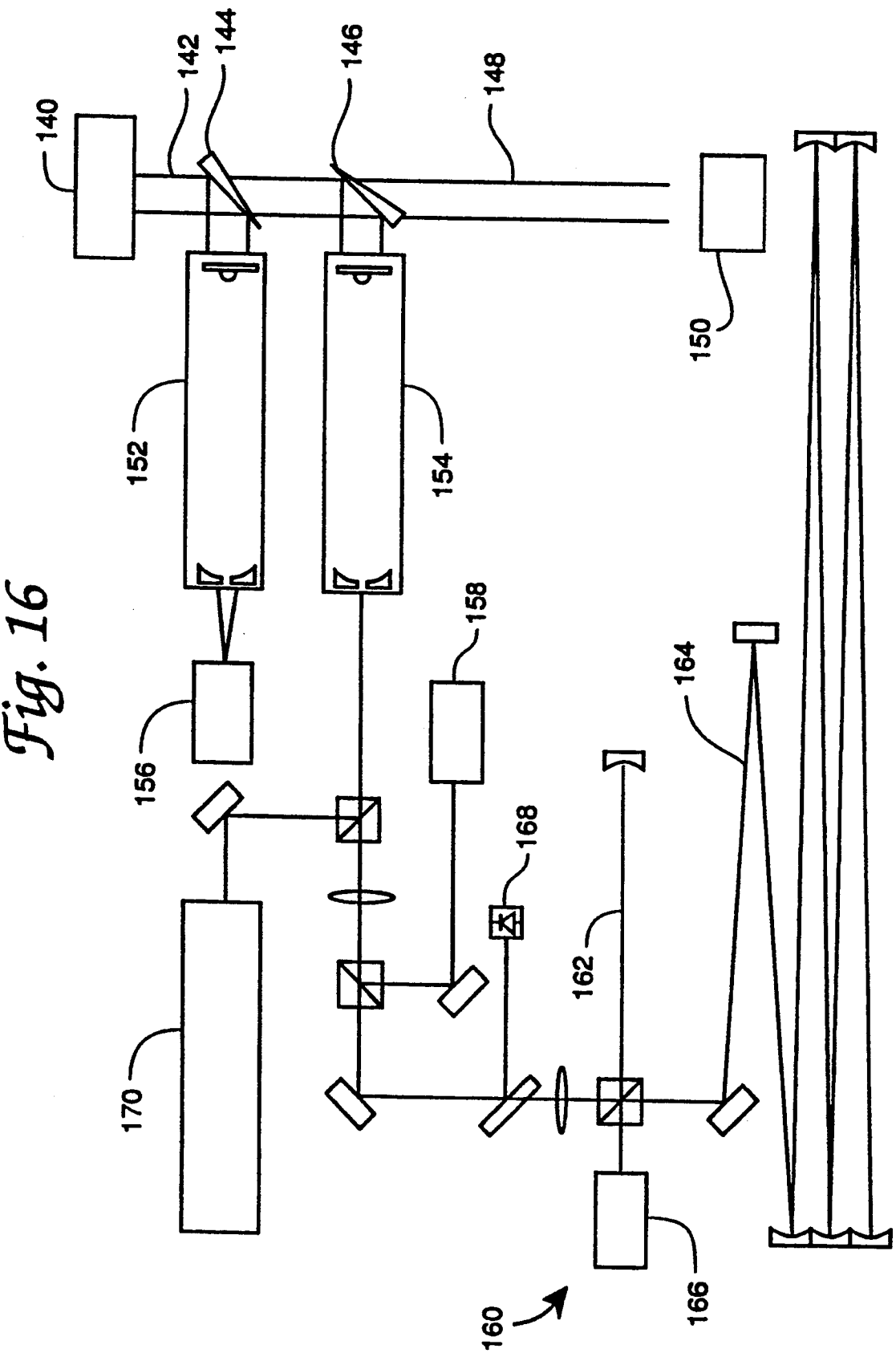
FIG. 16 illustrates schematically apparatus for different laser beam diagnostics.
Figure 17:
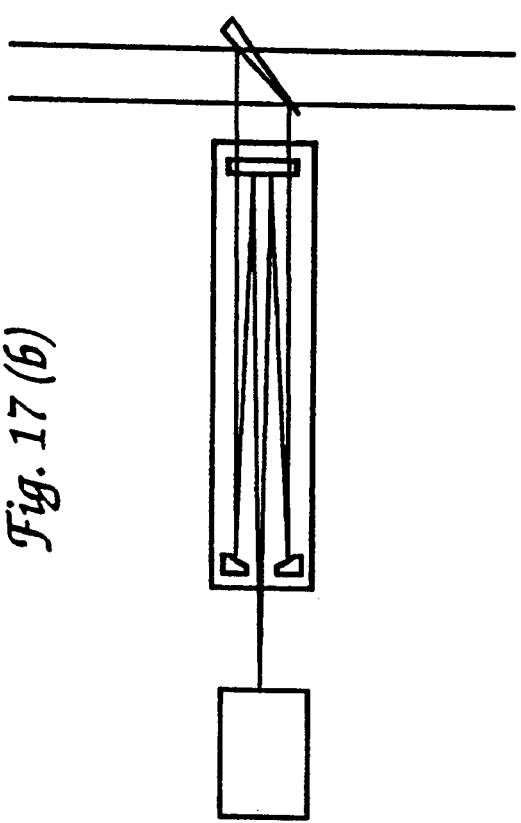
FIGS. 17(a) to (d) illustrate schematic means to measure laser beam quality (near- and fair-field), coherence length, and polarization.
Figure 17:
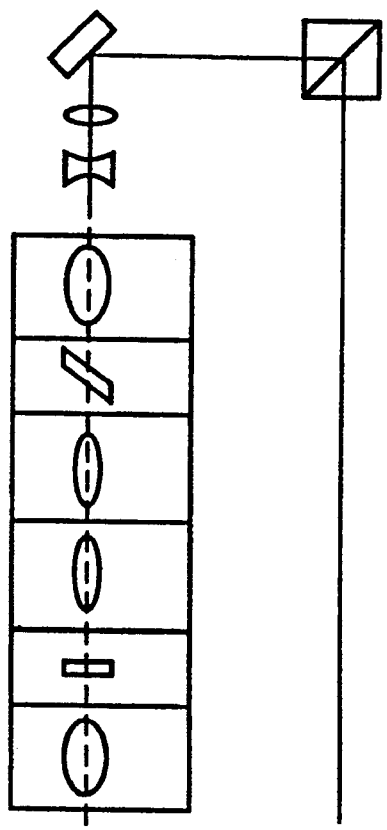
Figure 17:
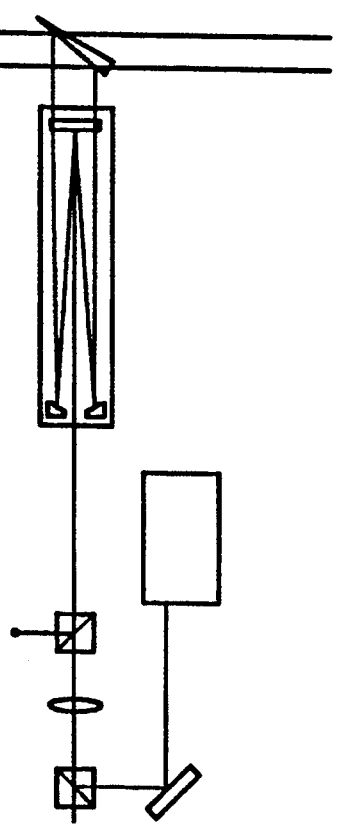
Figure 17:
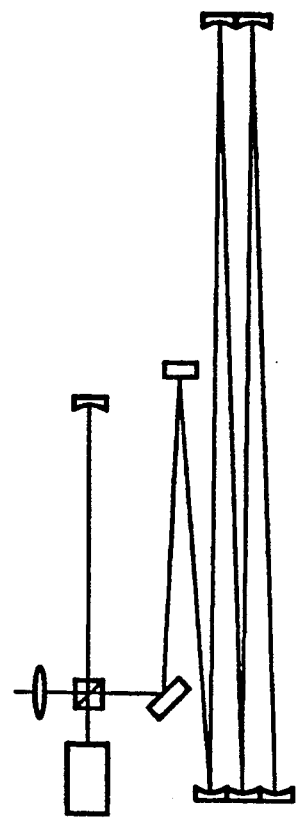

FIGS. 16 and 17 show respectively the layout for the different laser diagnostics and detailed schematics of the individual approaches employed. To monitor the laser beam profiles from both the stable and unstable resonator operation of the iodine laser, two monitoring techniques was employed. The first method, mainly for quick observation, was a 10 inch square, Kodak thermal sensitive, phosphorescent IR screen which was very sensitive to 1.315 micron radiation. It fluoresced for approximately a second after the laser pulse. Sometimes a UV blocking/1.315 micron transmissive filter was used to the very intense visible light produced by the flashlamps. The second detecting technique was the Hamasatsu camera system described above. In FIG. 16, a laser 140 outputs a beam 142 to be investigated. The beam 142 enters two optical beam splitters 144 and 146. The through beam 148 is used for power measurement by an energy meter 150. The split-off beams enter far-field and near-field telescopes 152 and 154, respectively; cameras 156 and 158 measure the beam characteristics desired. The coherence length is measured by a Michelson interferometer 160 having short and long legs 162 and 164, respectively, and a camera 166 with a fast photodetector 168 before such. A Brewster plate polarimeter 170 provided additional measurement. This unit was also used in the beam quality and coherence measurements. To obtain the beam quality measurements, two different Casegrainian telescopes were used. Again using a 4% mirror optical flat, one inch thick with mirror flatness ($\lambda$/10) provided 0.4% of the laser beam energy into the telescope. This quartz flat's mirror figure was critical since it could ultimately affect the resultant beam quality measurements. The output of each of these telescopes was then detected by the infrared camera and subsequently monitored. Such data was then analyzed to assess the laser beam quality. Next, the collimation of the laser was determined by propagating the laser distances greater than 100 meters and examining the beam profile with the two detection schemes. The coherence length measurements was determined by demonstrating interference from a variable arm distance difference of a Michelson interferometer as previously described. Finally, the polarization of the laser beam from the unstable resonator, a double Brewster window combination was used. Knowing the expected angular position of the polarized radiation, the Brewster window system was rotated to obtain the different transmission. Comparison with calculated transmission results determined the polarization nature of the laser beam.

Figure 18:
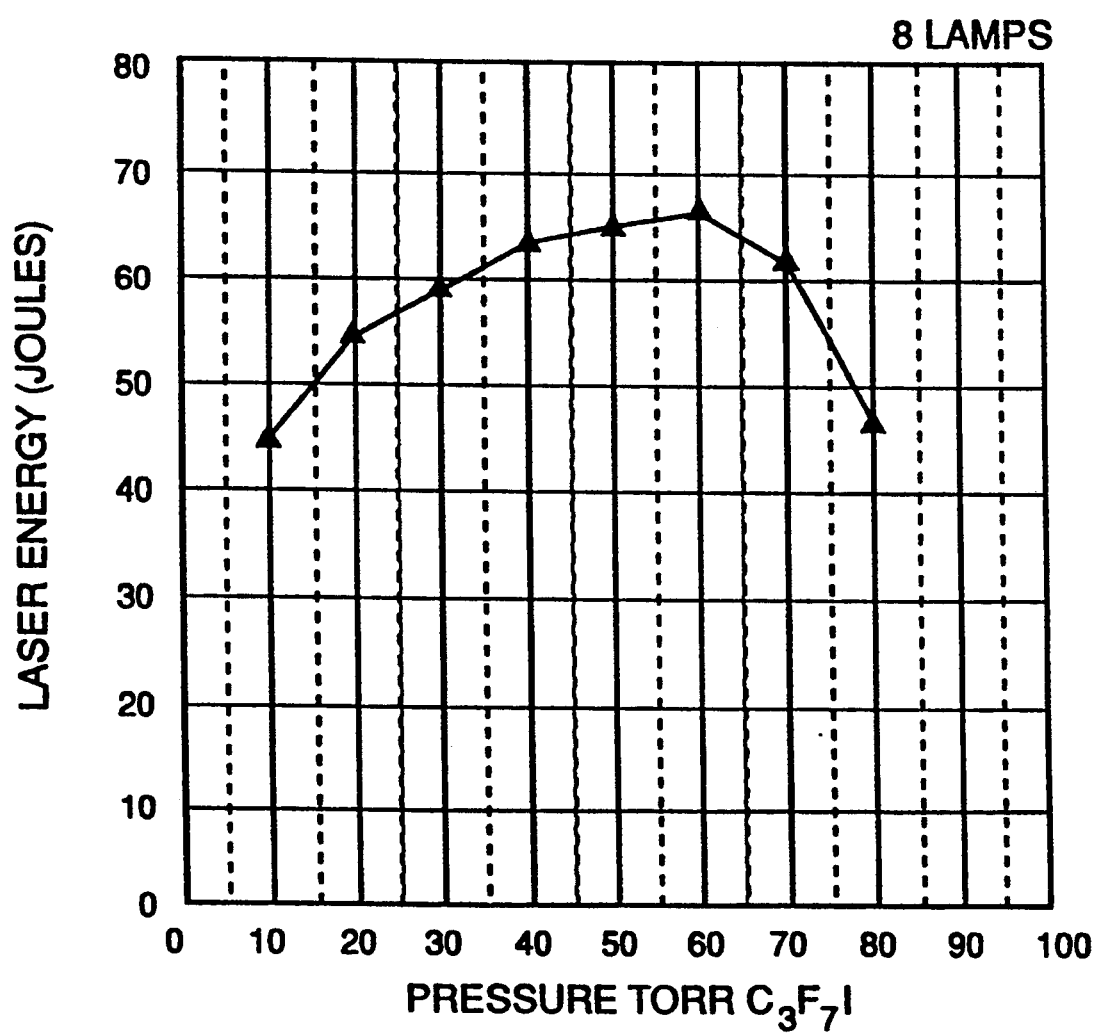
FIG. 18 illustrates performance of the laser of the present invention for various pressures using a stable resonator.
Figure 19:
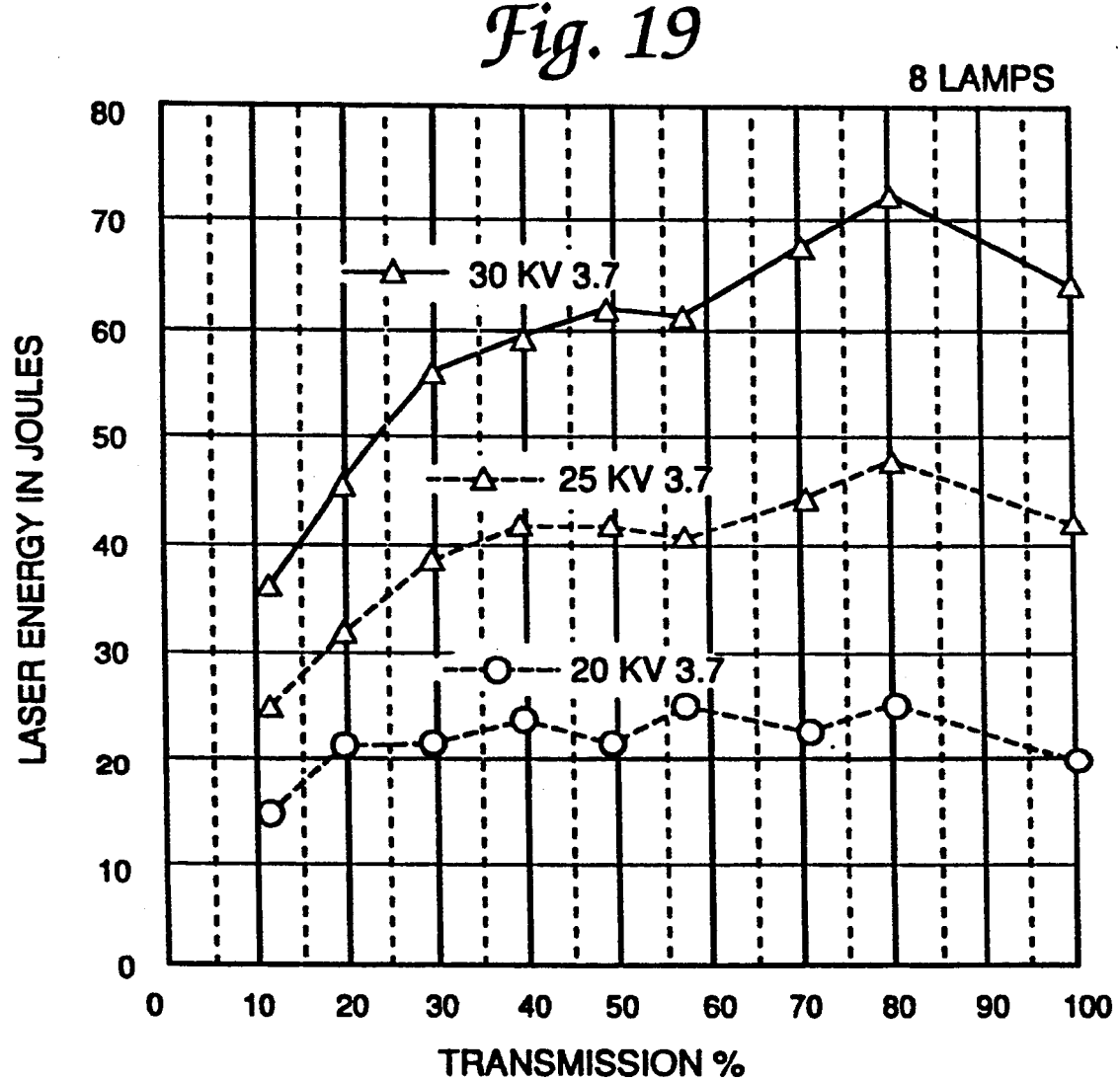
FIG. 19 illustrates laser energy versus transmission with a hemispherical stable resonator.
Figure 20:
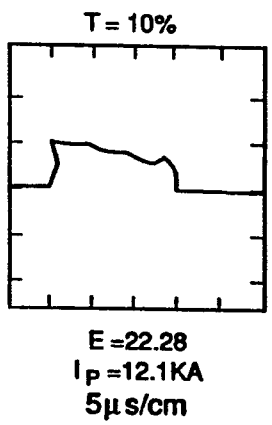
FIGS. 20(a) to (f) illustrate the effect of output coupling with the stable resonator on laser pulsewidth using 8 lamps for photolytic pumping.
Figure 20:
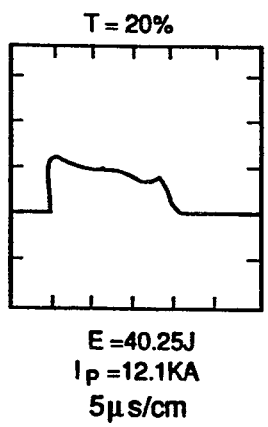
Figure 20:
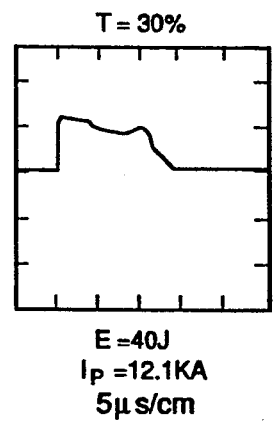
Figure 20:
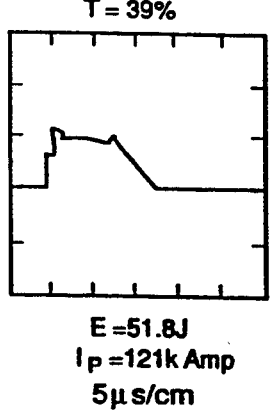
Figure 20:
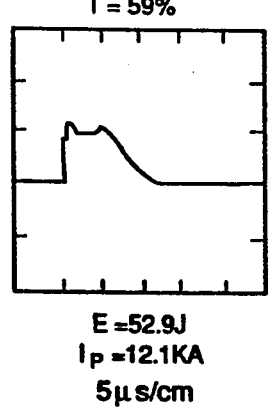
Figure 20:
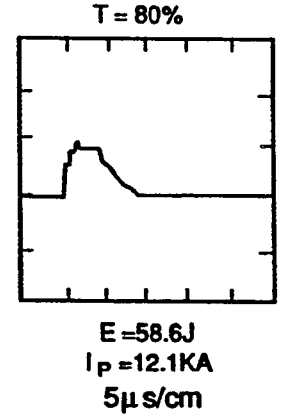

To design the unstable resonator for optimum extraction of the energy from the photolytic excited atomic iodine gain medium, a Rigrod gain-saturation curve was obtained. This curve was particularly important since the self-terminating nature of the iodine transition makes it very difficult to predict the saturation intensity. Using a hemispherical stable resonator with the 10 meter radius of curvature, maximum reflectivity at 1.315 microns and an 80% transmitting flat, the laser energy was determined for different $C_3F_7I$ pressures as shown in FIG. 18. The maximum laser energy was obtained near 60 torr with a small change as this pressure varies from 30 to 60 torr. Later results will show that optimum unstable resonator operation occurs when 30-45 torr of $C_3F_7I$ exists in the photolytic iodine laser medium. FIG. 19 gives the gain-saturation curve versus the transmission of the stable resonator mirror. Although there is some variation in this curve, no well defined peak for the optimum transmission exists. Such a behavior indicates that the most of the energy can be extracted from the iodine gain medium but just at a slower rate which corresponds to longer pulsewidths. The transient pulseshape data of FIGS. 20(a)-(f) illustrates this feature. With impurity free $C_3F_7I$, the quenching loss for excited iodine atoms ($5^2P_{\frac{1}{2}}$) is very small as discussed above. Previous gain measurements show that the gain in excited iodine gain medium will last for millisecond with very small decreases. Consequently, no matter what transmissive coupling exists, the majority exists, the majority of the available energy will be extracted as laser energy. Therefore, to obtain the optimum transmissive couple, the transient pulseshape data must also be examined in comparing it to the flashlamp current. For transmissive couplings near 90%, the laser pulseshape very closely follows the current pulse while still extracting nearly the maximum energy from the iodine gain medium. Using the relations cited above between the geometrical coupling $^cG$ and the magnification of the unstable resonator of FIG. 13 was then dictated by the known length between the mirrors, 2.84 meters.

Figure 21:
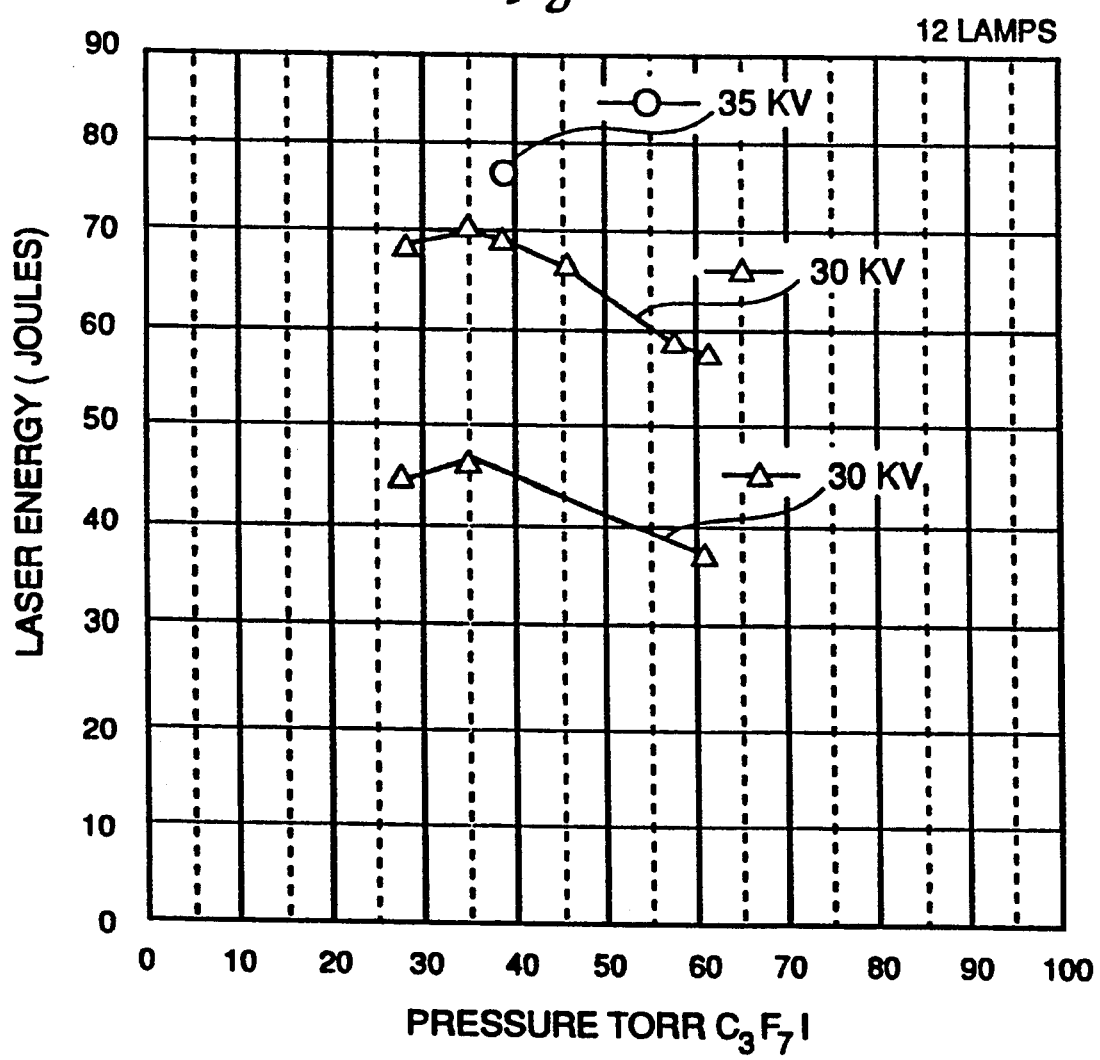
FIG. 21 illustrates laser energy versus $C_3F_7I$ pressure for 12 lamp arrangement at different flashlamp capacitor energies with an unstable resonator of magnification M=3.
Figure 22:
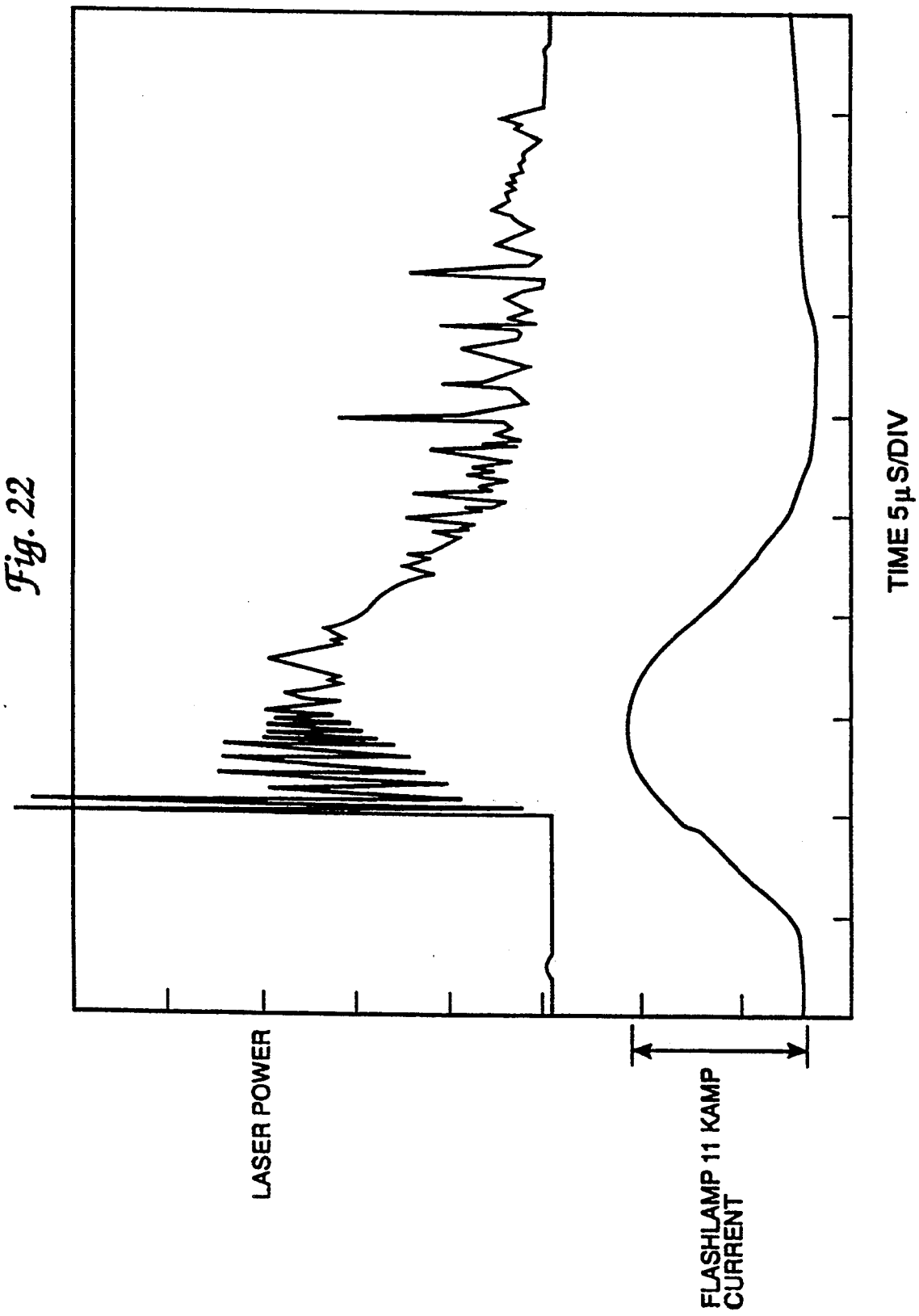
FIG. 22 illustrates a comparison of the transient behavior of flashlamp current and laser signal for M=3 confocal unstable resonator as shown in FIG. 13 and characterized in FIG. 21.
Figure 23:
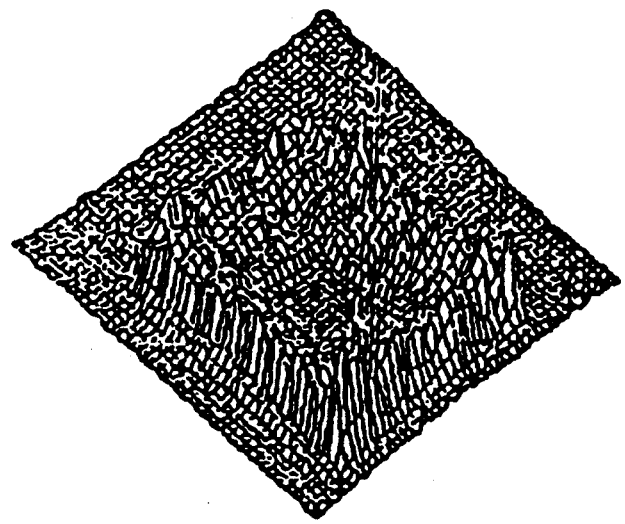
FIGS. 23(a) to (b) illustrates the near and far-field laser beam profile with an unstable resonator of magnification M=3 of FIG. 13.
Figure 23:
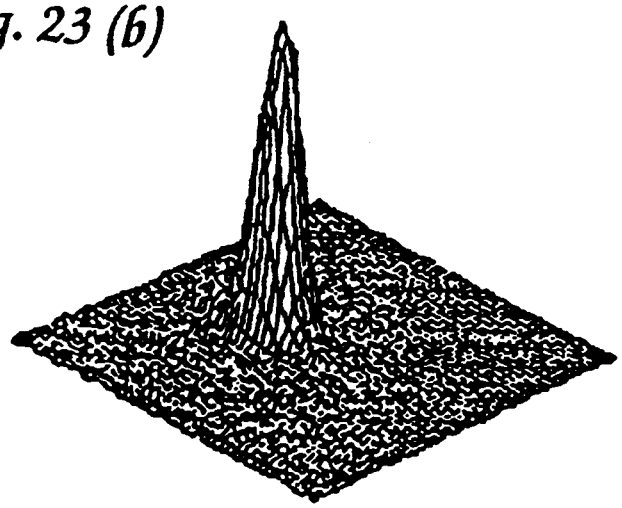
Figure 24:
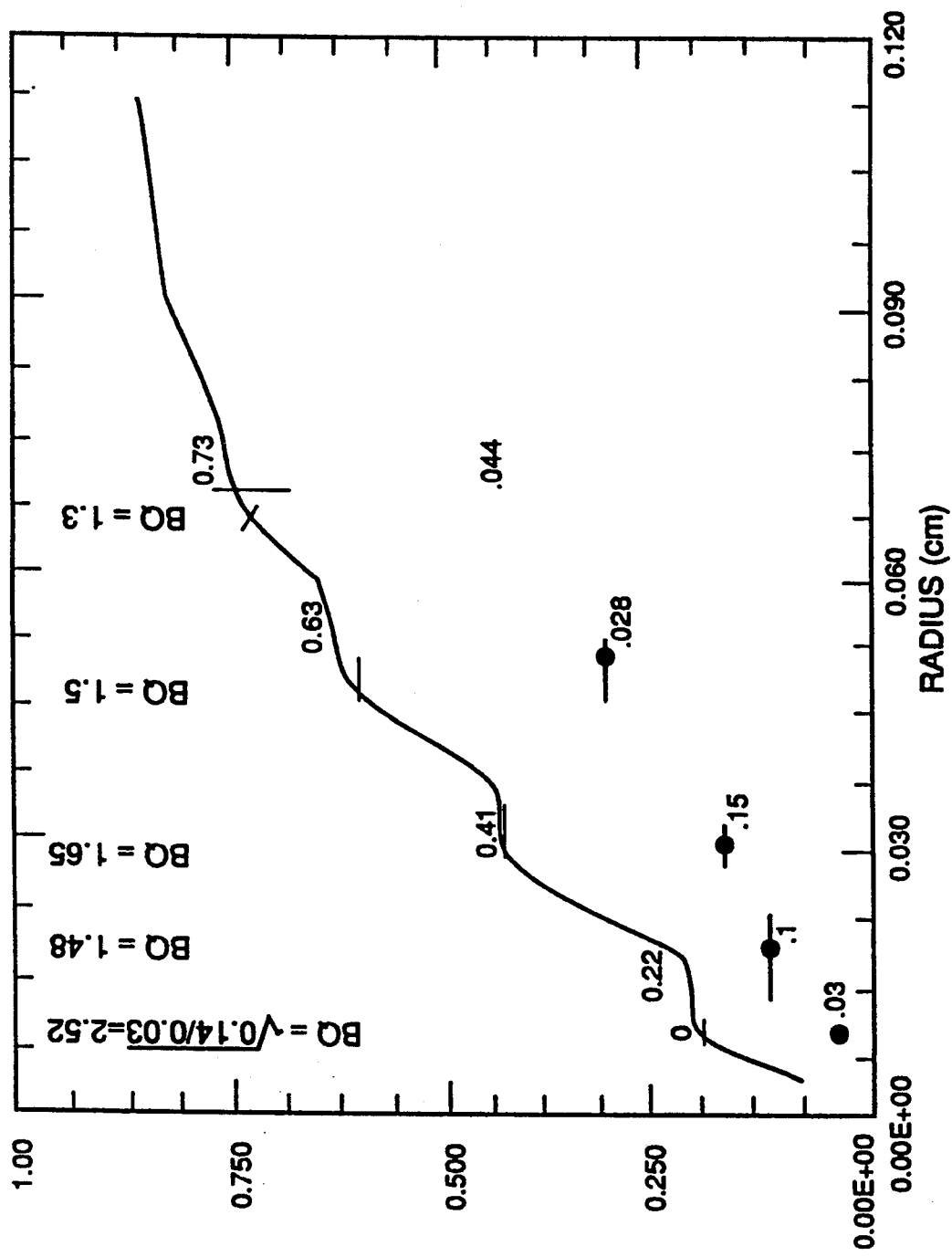
FIG. 24 illustrates the ratio of integrated theoretical intensity and experimental intensity profiles versus radial distance from the center of laser beam in the far-field (focal plane) for the M=3 unstable resonator of FIGS. 13, 19-21.

FIG. 21 shows the extracted energy from this M=3 unstable resonator versus the $C_3F_7I$ pressure showing that optimum pressure operation is approximately 30 to 45 torr. This behavior was similar for each of the three capacitor energies examined. FIG. 22 shows the resultant laser pulseshape relative to the flashlamp current transient behavior illustrating a delay of 3-4 $\mu$sec before the onset of the laser pulse. Except for this delay caused by the transient build-up of UV radiation in the flashlamp, FIG. 9(c), and similarly the establishment of an iodine inversion, the laser pulseshape follows quite closely that of the current. The "noise features" on this laser signal are relaxation oscillations. FIG. 23 shows the near-and far-field laser beam profiles using this unstable resonator. The near-field data of FIG. 23(a) indicates a nearly flat profile with the square hole absence due to the feedback part. The far-field data of FIG. 23(b) illustrates the very strong central lobe and very low intensity of the side lobes. These far-field laser beam profiles were obtained using the telescope described above. Analyzing this far-field data as function of its radial distance from the center, the beam quality of the laser beam can be determined. The far field beam intensity pattern (focal plane) is given by the expression $$I(\psi) = \frac{4E^2}{\lambda^2} (\pi\rho_2{}^2)^2 \left[ \frac{J_1(z_2)}{z_2} - \left(\frac{\rho_1}{\rho_2}\right)^2 \frac{J_1(z_1)}{z_1} \right]^2 \quad (7)$$

where $\rho_1$ and $\rho_2$ are the radii of the inner and outer edges of the beam annulus, respectively, and E is the electric field. The quantities $z_i$ equal $\pi\phi\rho_1/\lambda$ where $\phi$ is the angular coordinate of the far-field point relative to the axis of the annulus. Integrating this expression versus the radius and then normalizing the relation provides a method of determining the beam quality (BQ) of the photolytic iodine laser. FIG. 24 shows the result of such analysis on the far-field beam profile of FIG. 23(b). The feature that the experiment data is quite close to the theoretical predictions for this unstable resonator is an indication of good beam quality. The BQ is given by the relation $$BQ = [I_o(r)/I(r)]^{\frac{1}{2}} \quad (8)$$

where $I_o(r)$ and $I(r)$ are respectively the theoretical and experimental intensity magnitudes. Performing such analysis on the data of FIG. 23(b) at several different radial positions gives a BQ of 1.4 times diffraction limited. This good beam quality is very understandable since the $C_3F_7I$ pressure inside the laser gain cell is quite low. The collimation of the laser beam was then tested by propagating it approximately 100 feet. By varying the distance between the mirrors with the bellow assembly shown in FIG. 13, excellent collimation was easily obtained. With these excellent beam quality and collimation results, an experimental measurement of the pulse to pulse laser repeatability and average power were determined as shown in FIG. 25(a). Examining the peaks of the laser energy over a five minute "run" at 0.5 Hz pulse rate, the consistency of the laser energy is apparent. This data clearly relates the reliable operation of this repetitively pulsed, photolytic iodine laser device. FIG. 25(c) presents the average power measured during this 5 minute "run". The slow time to reach equilibrium is associated with the Scientech detector. During the time these repetitive energy measurements were being made, the laser beam jitters less than 1 microradian occurred.

Besides the recent coherence length measurements of the Low power, cw photolytic iodine laser, there exist no other known coherence length results for any other type of photolytic iodine laser. Using a conventional Michelson interferometer, the existence of fringes were monitored as the distance between the arms was varied. Using the infrared camera described previously, interferometric fringes for arm length differences of 45 meters were easily detected. The interferometric fringes were obtained from a laser beam from the M=3 unstable, confocal resonator shown in FIG. 13 and characterized by FIGS. 19 to 23 showing the coherence of the laser with an arm length difference of 35 meters. These stable fringes clearly demonstrated the long coherence length of this photolytic iodine laser. Such coherence length indicate that on one hyperfine transition can only exist. Above, an analysis of the gain profiles at $C_3F_7I$ pressure of 30–60 torr showed that these profiles were strongly pressure broadened. Consequently, it seems reasonable to conclude that the iodine gain medium acts as a homogeneously broadened transition. Since only one longitudinal mode can lase in homogeneously broadened transition, the coherence length observed here are explainable. Much longer coherence length may exist, but their measurement are very difficult requiring transient laser linewidth measurements. Regardless, the demonstrated coherence length clearly shows that the iodine gain medium does not lase on more than one hyperfine transition or longitudinal modes. Using the double Brewster window, the polarization of the laser beam was determined. By rotating this unit, the polarization was determined to have an extinction greater than 100:1.

Figure 26:
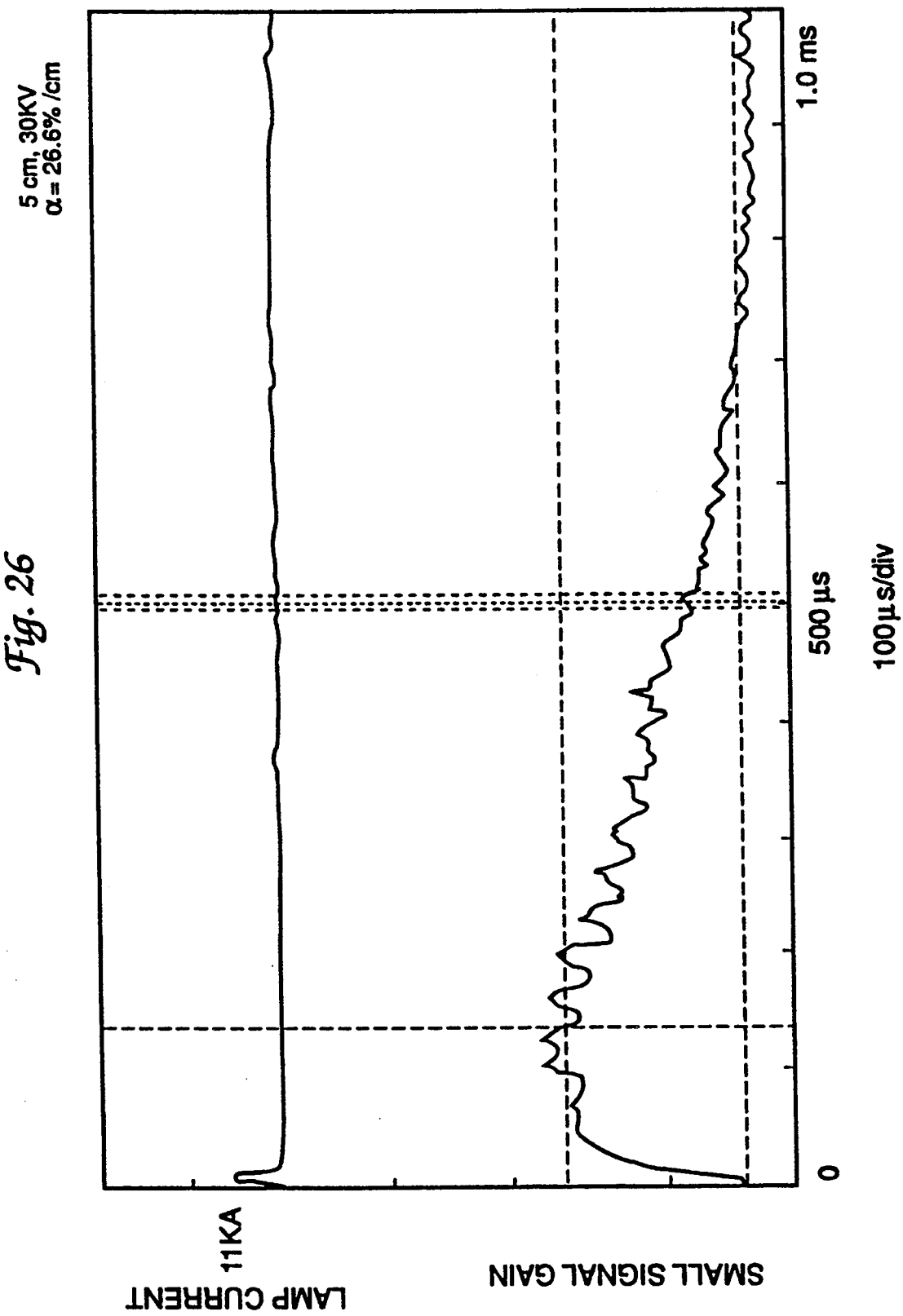
FIG. 26 illustrates a small signal gain coefficient for the pulsed iodine gain medium at 35 torr and 30 KV at flashlamp for a 5 cm gain length.

In characterizing the pulsed, photolytic atomic iodine gain medium of this laser device, the small signal gain coefficient for various pressures and flashlamp energy is shown in FIG. 27 where the measurements had to be made only through a path length of 5 cm. The large small signal gains presence in the iodine gain mediums prevented longer gain length since the medium would lase even with only AR coated windows. Two valuable pieces of information can be interpreted from these gain measurements. A gain of 26.6%/cm illustrates why parasitic control in the unstable resonator was quite difficult to achieve. Even with only 5 cm of gain length, $g_oL$ products greater than 1 can be achieved. FIG. 26 illustrates that the gain has a few microsecond risetime before it reaches it maximum value. This build-up of gain is directly associated with the flashlamp's transient UV emission. Lastly, this data shows that the iodine gain persists for a long time with only a small decrease from its peak value at the end of the flashlamp pulse. This condition enables most of the iodine medium's stored energy to be extracted even when low output coupling fraction are used. Finally, it must be stated that during lasing, these large peak gain values do not exist since the lasing is saturating the medium.

Figure 28:
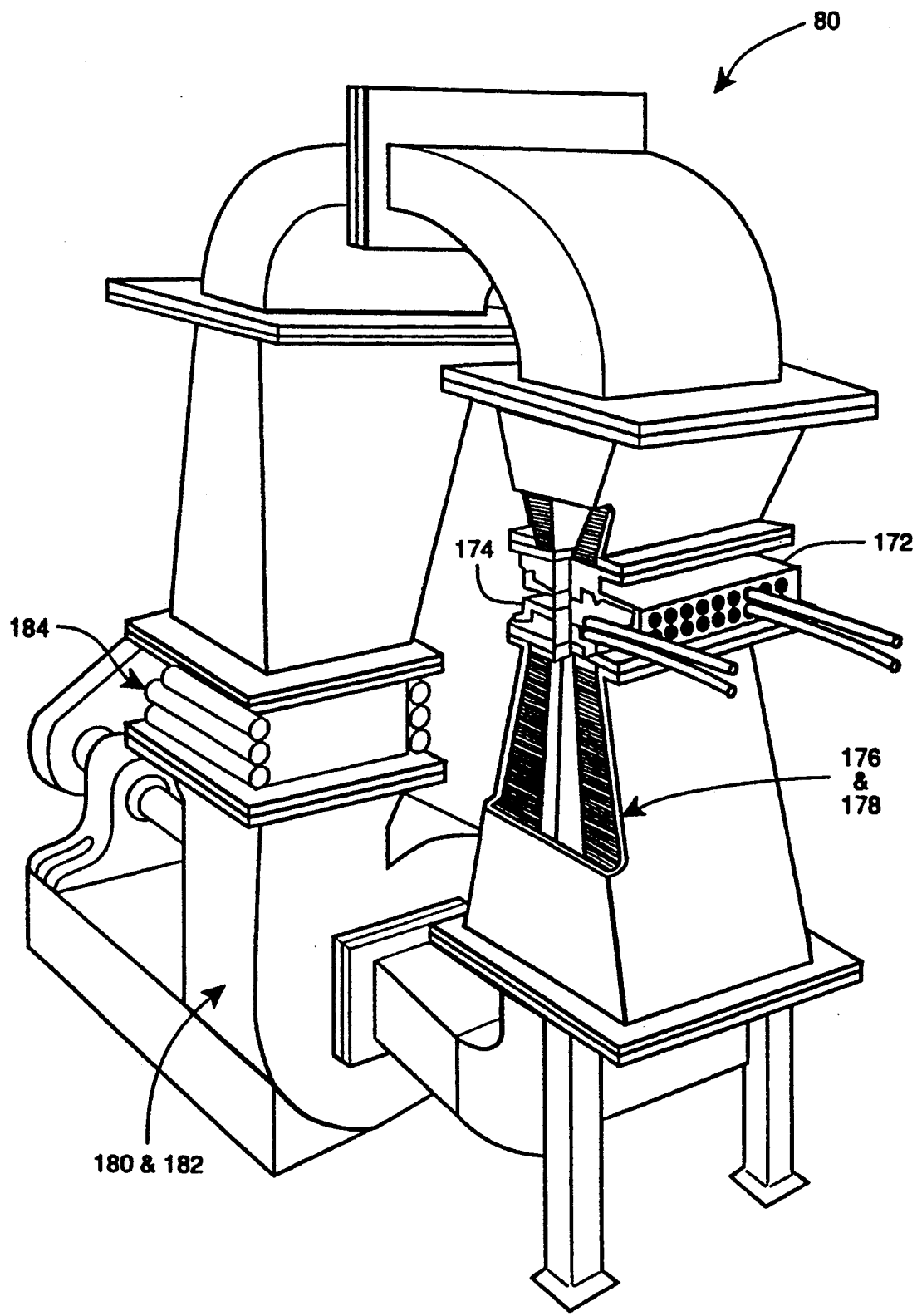
FIG. 28 illustrates another embodiment of the present invention of a compact transverse flow, pulsed photolytic atomic iodine laser at 1.315 microns.

To assure the iodine gain medium was optically clear before another flashlamp pulse excited the medium, laser interferometric measurements at 514.5 nm were performed in FIG. 28 showing the results at various times after the flashlamp excitation pulse. The results are obvious and clearly show that the medium is optically clear in less than one second after the flashlamp pulse. Some heating effects from the UV window fence occurs close to these window edge, put it has negligible effect on the far-field laser beam quality.

The above specification of the pulsed, photolytic iodine lasers at 1.315 micron has demonstrated remarkable performance by using a 3 magnification, unstable confocal resonator to extract a large fraction of the lowest order mode. Optical diagnostics of the laser beam relates its excellent beam quality less than 1.5 times diffraction limit, good collimation and polarization extinction, plus a coherence length greater than 45 meters. Using the iodine ($I_2$) removal with an internal turbo-molecular blower, long and reliable operation of this laser device was obtained. Although the above invention describes a laser using a pair of longitudinal gain cells, traverse gain cells can provide additional benefits.

Using a longitudinal gain cell as above where the gain medium flow exceeds 10 m/s, the system is able to flush the photolytically activated medium in less than one second over two separate paths of 125 cm each. This gives a transit time near 100 milliseconds through the iodine gain cells which limits the number of pulses per second. Incorporating transverse flow through the gain cell with a width of 10 cm and using the same turbo-molecular blower lowers the transient time across the iodine gain medium to only 10 milliseconds. Operation at pulse rates as high as 10 Hz are possible. Further, the turbo-molecular blower may be operated up to 24,000 rpm to significantly increase the flow velocity. Since the gain in an iodine gain medium lasts for a long time after the UV flashlamp's excitation, much shorter pulses can be obtained using an electro-optical (E-O) switch internal to the resonator cavity. Besides the shorter pulses, any desired transient signal could be established with such internal devices. To overcome parasitic oscillations all internal optical elements such as AR windows and E-O switches should be placed at an angle to prevent any reflection generated parasitics.

Referring to FIG. 27, a transverse flow, pulsed photolytic iodine laser 80 is shown schematically. Upstream or downstream of a transverse iodine gain cell 82 are placed acoustical attenuators 86 to dampen the shock wave/medium disturbances present in the photolytic iodine gas gain medium 82 after the pulsed flashlamps 84 are fired. The iodine gain medium 82 is excited from both the top and bottom through quartz UV windows. Also, upstream to the iodine gain medium 82 and before the acoustical absorber 86 as shown above are two heat exchangers/laminar flow straighteners 88 to assure uniform gas density. Downstream to the gain cell 90 and after the other acoustical attenuator 86 is the transverse flow blower 92 and the $C_3F_7I$ iodine ($I_2$) removal system 94 with cold plates 93 therein. The evaporator section 95 receives the liquid $C_3F_7I$ from the removal system 94. Splash plates 85 are located above the evaporator section 95. FIG. 28 illustrates this laser system 80 in a compact configuration with flashlamps 172 operating on a gain cell 174. After the gain cell 174 are acoustical absorbers 176 and flow straighteners 178. A $C_3F_7I$ scrubber 180, a blower 182 and a heat exchanger 184 are also included.

These iodine gain media 82 can be excited for nearly 100 μsec at similar power levels. Operating as such could increase the extracted energy to greater than 50 joules/liter and likely 100–200 joules/liter with negligible medium density perturbations. Excellent laser beam quality would similarly occur. By increasing the flow velocity to 100 meters/sec, repetition rates from 100–200 pps are possible. At these pulse rates with the above laser energies, average powers greater than 10 KW should easily be obtained. In addition, any desirable pulseshape at variable pulse rates could be achievable. The low excited states quenching enables the gain at 1.315 microns to experience small decay for long times (milliseconds). This features provides energy storage and thus E-O switching can produce any desired pulseshape. The closed cycle, $C_3F_7I$ Iodine ($I_2$) removal system with its internal turbo-molecular blower should enable this system to operate for sustained times (weeks) without any noticeable degradations.

Clearly, many modifications and variations of the present invention are possible in light of the above teachings and it is therefore understood, that within the inventive scope of the inventive concept, the invention may be practiced otherwise than specifically claimed.

What is claimed is:

1. A repetitively pulsed, high output, photolytic atomic iodine laser system, said laser system comprising:
   a means for selectively and repeatedly providing ultraviolet radiation to a laser gas medium to produce exclaimed atomic iodine;
   a fuel system, said fuel system including means for providing a continuous flow of a laser fuel to form said laser gas medium, said continuous flow being provided by a turbo-molecular blower, said turbo-molecular blower having a rotor to move said laser fuel, said rotor being vacuum sealed therein by means of a ferrofluidic vacuum rotating seal, said blower being able to move said laser fuel being of a high molecular weight gas in a velocity range of about 10 m/s to 100 m/s in a pressure range of 20 to 60 torr;
   at least one laser gain cell, said laser gain cell having said laser gas medium flying therethrough, said laser gain cell receiving said flowing laser gas medium from said fuel system, said laser gas medium therein reacting with said ultraviolet radiation; and
   a laser resonator, said laser resonator optically connected to said laser gain cell, said laser resonator outputting a laser beam, said laser resonator allowing multiple passes of said laser beam through said laser gain cell.

2. A laser system as defined in claim 1 wherein said means for selectively and repeatedly providing ultraviolet radiation comprises a plurality of flashlamps and at least one current source for repetitively driving said flashlamps, said flashlamps being positioned about said at least one gain cell, said flashlamps outputting ultraviolet radiation into said gain cell through a window in said gain cell.

3. A laser system as defined in claim 2 wherein said flashlamps are at least positioned on opposing sides of said at least one gain cell to produce uniform gain in said gain cell.

4. A laser system as defined in claim 2 further including means for cooling said flashlamps.

5. A laser system as defined in claim 4 wherein said means for cooling provides flowing liquid with minimization of UV absorption to maximize extractable laser energy.

6. A laser system as defined in claim 2 wherein said current source causes said flashlamps to output about 300 MW, 1.7 Kj, of UV radiation per pulse.

7. A laser system as defined in claim 2 further including reflectors behind said flashlamps, said reflectors focusing said ultraviolet radiation from said flashlamps into said laser gas medium in said gain cell.

8. A laser system as defined in claim 7 further including a high UV reflecting coatings on said reflectors to prevent degradation thereof from UV radiation.

9. A laser system as defined in claim 2 wherein said flashlamps are capable of being pulsed at a rate of at least 0.5 Hz.

10. A laser system as defined in claim 1 wherein said fuel system is a closed cycle system.

11. A laser system as defined in claim 10 wherein said fuel system comprises:
   an evaporator section, said evaporator section having a liquid fuel therein, said liquid fuel being made gaseous therein,
   a turbo-molecular blower, said turbo-molecular blower receiving said gaseous fuel and outputting said gaseous fuel at a given pressure and velocity, said gaseous fuel being output into said laser gain cell;
   a condensor section, said condenser section receiving spent gaseous fuel from said gain cell and converting said gaseous fuel into said liquid fuel; and means for removing undesired materials from said spent gaseous fuel and said gaseous fuel.

12. A laser system as defined in claim 1 wherein said laser fuel is an alkyl-iodide.

13. A laser system as defined in claim 12 wherein said alkyl-iodide is $C_3F_7I$.

14. A laser system as defined in claim 13 wherein said $C_3F_7I$ is n-$C_3F_7I$.

15. A laser system as defined in claim 1 wherein said laser fuel is $C_3F_7I$.

16. A laser system as defined in claim 11 wherein said turbo-molecular blower is able to transport $C_3F_7I$ at least at 10 m/s to about 100 m/s in a pressure range of 20 to 60 torr.

17. A laser system as defined in claim 16 wherein said pressure is preferrably 30 to 45 Torr.

18. A laser system as defined in claim 11 wherein said turbo-molecular blower includes a rotor which is vacuum sealed inside thereof by means of a ferrofluidic vacuum rotating seal to prevent oil contamination of said laser fuel.

19. A laser system as defined in claim 10 wherein said laser fuel has contaminants removed.

20. A laser system as defined in claim 19 wherein said contaminants are at least $O_2$, $H_2O$, $I_2$ and $N_2$.

21. A laser system as defined in claim 10 wherein said spent laser fuel and cleaned laser fuel pass through means to remove $I_2$.

22. A laser system as defined in claim 1 wherein said at least one laser gain cell operates in a mode selected from the group consisting of longitudinal or transverse.

23. A laser system as defined in claim 22 wherein said gain cell is in the longitudional mode.

24. A laser system as defined in claim 23 wherein 2 longitudional gain cells have said laser fuel flowing therein.

25. A laser system as defined in claim 22 wherein said laser gain cells includes UV windows.

26. A laser system as defined in claim 25 wherein each gain cell has a pair of opposing UV windows.

27. A laser system as defined in claim 22 further including means to minimize parasitic oscillations.

28. A laser system as defined in claim 27 wherein said means includes a fence placed upon said UV windows.

29. A laser system as defined in claim 1 wherein said laser resonator operates in a mode selected from the group consisting of unstable or stable.

30. A laser system as defined in claim 29 wherein said resonator is an unstable confocal resonator.

31. A laser system as defined in claim 30 wherein said resonator operates on a postive branch.

32. A laser system as defined in claim 1 wherein said resonator is an unstable, confocal resonator with a magnification of about 3, further including a p-polarization flat means therein.

33. A laser system as defined in claim 15 wherein said laser fuel is $C_3F_7I$ and lases at 1.315 microns.

34. A laser system as defined in claim 32 wherein a laser beam output by said resonator is 1.5 diffraction limited, 100:1 polarization extinction, collimated, and has a coherence length greater than 45 meters.

35. A laser system as defined in claim 22 wherein said resonator is in the transverse mode.

36. A laser system as defined in claim 35 wherein said UV radiation is pulsed into said transverse gain cell at a rate of at least 10 Hz.

37. A repetitively pulsed, high output, photolytic laser system, said laser system comprising:
  a means for selectively and repeatedly providing ultraviolet radiation to a laser gas medium to produce excited atomic composition;
  a fuel system, said fuel system including means for providing a continuous flow of a laser fuel to form said laser gas medium, said continuous flow being provided by a turbo-molecular blower, said turbo-molecular blower having a rotor to move said laser fuel, said rotor being vacuum sealed therein by means of a ferrofluidic vacuum rotating seal, said blower being able to move said laser fuel being of a high molecular weight gas in a velocity range of about 10 m/s to 100 m/s in a pressure range of 20 to 60 torr;
  at least one laser gain cell, said laser gain cell having said laser gas medium flowing therethrough, said laser gain cell receiving said flowing laser gas medium from said fuel system, said laser gas medium therein reacting with said ultraviolet radiation; and
  a laser resonator, said laser resonator optically connected to said laser gain cell, said laser resonator outputting a laser beam, said laser resonator allowing multiple passes of said laser beam through said laser gain cell.

38. A laser system as defined in claim 37 wherein said laser gas medium is a photolytically pumped gas.

39. A laser system as defined in claim 38 wherein said laser fuel is selected from the group consisting of $C_3F_7I$, $C_3F_7Br$, and IBr.

* * * * *